United States Patent [19]

Tuttle

[11] Patent Number: 5,153,886
[45] Date of Patent: Oct. 6, 1992

[54] VISUAL DISPLAY SIGNAL PROCESSING SYSTEM AND METHOD

[75] Inventor: Myron R. Tuttle, Santa Clara, Calif.

[73] Assignee: Hewlett Packard Company, Palo Alto, Calif.

[21] Appl. No.: 472,689

[22] Filed: Jan. 31, 1990

[51] Int. Cl.⁵ .............................................. G06F 11/00
[52] U.S. Cl. ................................... 371/67.1; 371/22.4
[58] Field of Search .................... 371/67.1, 22.4, 25.1, 371/24, 71, 20.1, 19; 340/715

[56] References Cited

U.S. PATENT DOCUMENTS

| | | | |
|---|---|---|---|
| 4,581,741 | 4/1986 | Huffman | 371/67.1 |
| 4,763,066 | 8/1988 | Yeung | 371/22.4 X |
| 4,993,027 | 2/1991 | McGraw | 371/22.4 X |
| 5,022,028 | 6/1991 | Edmonds | 371/19 |

OTHER PUBLICATIONS

Davis et al., "Signature Analysis Test or Self-Test of CRT Blinking Attributes in a Microprocessor-Based System", IBM TDB, vol. 23, No. 7B, Dec. 1980, pp. 3100-3101.
IBM TDB, "Automated Video Test Card with Self-Test Mechanisms", vol. 32, No. 5B, Oct. 1989, pp. 257-263.
"The Atron Evaluator.", Cadre Technologies Inc. 1989.

Primary Examiner—Robert W. Beausoliel
Attorney, Agent, or Firm—Roland I. Griffin; Alan H. Haggard

[57] ABSTRACT

A computer hardware-related device and method is used for regression testing techniques involving the testing of computer hardware and/or software application(s). Input data is received from a host, and is directed to software application(s) on a System Under Test (SUT). Command are also received from the host, which causes the capture of a representation of visual display data from a visual display device on the SUT. A representation of this visual display data is then sent to the host. When a command and a representation of visual display data from the host (previously obtained from the SUT) is received, a new representation of visual display data is captured from the visual display device on the SUT. A comparison is than made between the new visual display data representation and the visual display data representation received from the host.

6 Claims, 14 Drawing Sheets

VISUAL DISPLAY SIGNAL PROCESSING SYSTEM AND METHOD

This application relates to U.S. patent application 472,694 entitled "Software Modules for Testing Computer Hardware and Software" and U.S. patent application 472,697 entitled "System and Method for Testing Computer Hardware and Software" which are incorporated by reference herein.

BACKGROUND TO THE INVENTION

1. Field of the Invention

The present invention relates to digital signal analysis techniques to test interactive software application(s) running on a System Under Test (SUT).

2. Related Art

Traditionally, the testing of interactive software applications require that an operator enter input data into a system under test (SUT), using a keyboard or other input device. As the input data is entered, the operator is then responsible for observing the results on a visual display screen of the SUT to determine if the software application being tested produces the expected result. This type of testing of interactive software applications is often referred to by those skilled in the art as regression testing.

Regression testing serves important functions throughout the software development industry. For example, during the process of developing a software application, it is often desirable to run each new version of a software application through a regression testing procedure to ensure that it responds to the input data in the expected manner. In addition, the fact that a software application under test performs as expected can be used as an indication that the hardware on which the software application runs is also performing as expected.

As noted above, regression testing has traditionally been performed manually (that is, a human operator enters the input data for each test). Manual regression testing of interactive software applications, however, is inadequate in several ways. First, manual regression testing is costly, since it is both time and labor intensive. Second, manual regression testing is inefficient and error-prone, since the operator conducting the test may fail to observe any improper visual display screen images of the SUT or enter inappropriate input data. An improper video display screen indicates to the operator that the SUT has not interpreted the input data correctly or that the SUT hardware has failed in some way. In addition, manual regression testing does not allow for production testing or development purposes, since real-time performance measurements and compatibility comparisons of the software cannot be efficiently made.

Automated means for performing regression testing of interactive software applications is therefore considered desirable.

One of the first methods for automating such regression testing of interactive software applications involves fixed interval or pacing systems. Such systems connect to the SUT user device interface ports and provide the input data to the software application running on the SUT at fixed intervals of time.

Fixed pacing systems such as these, however, are undesirable for several reasons. Since no feedback is being gathered from the SUT, there is no indication that the SUT is executing the software application correctly. It is often the case that a fixed interval is impossible to predetermine, and overrun results. Also, since the input data is sent to the SUT at fixed intervals, performance measurements of the software applications and the hardware of the SUT cannot be measured. Moreover, without some type of feedback, it is impossible to determine if the SUT is actually displaying the expected images on its video display screen.

Several later efforts to achieve an automated solution to regression testing are inadequate in similar ways. Attempts at applying software patches or modifying actual software application code to create feedback internal to the code are inadequate because they cause changes in the behavior of software applications in very unpredictable ways. These behavioral changes further prohibit accurate performance measurements from being made of software applications.

Automan, jointly developed by Hewlett Packard Corporation of Palo Alto, Calif. and Telamon Corporation of Oakland, Calif., is a system designed for automated regression testing of interactive software applications. However, the Automan system was designed for testing interactive software applications running on a computer which utilizes a terminal. As such, Automan is based on the existence of a data stream passing over a communication line between the terminal and the computer running the software application using a communication protocol. Because Automan requires this data stream and terminal communication protocol, it is not directly applicable to personal computers, which integrate the keyboard, display and processor.

Moreover, Automan only monitors the data stream for expected characters. Automan does not provide a means for ensuring that the actual visual display screen image is correct. Thus, if the test has failed in some way, it is very possible that while correct data passed to the terminal, the visual display screen was nonetheless incorrect.

Another method of performing regression testing of interactive software applications involves monitoring the image of the visual display screen and periodically capturing the visual display data (which controls the image on the visual display screen) on the SUT's visual display device. Once the visual display data is captured, that is, intrusively accessed by an outside system, a comparison of this data is made against earlier received visual display data.

This method is undesirable because it is extremely invasive to the SUT, requires large blocks of memory for visual display data captures, and destroys any real-time nature of the tests.

SUMMARY OF THE INVENTION

The deficiencies of the above-noted conventional systems and methods led the inventor to invent an automated regression test system and method which would be:

1. Non-intrusive to the System Under Test.
2. Capable of performing both controlled-time and real-time performance testing. (Controlled-time means that fixed time delays are inserted via the input data to control when certain events take place on the SUT. Real-time performance testing means the ability to determine the actual response time of events taking place on the SUT).
3. Capable of emulating alphanumeric and graphical input devices.

4. Capable of excluding portions of a visual display screen image from the comparison. (Often a correct visual display screen image is slightly different each time because of time variant information such as a displayed date, path, etc.)
5. Compatibility with other computer systems and monitors.
6. Capable of accessing the actual visual display data of the SUT if a comparison fails. This is desirable, since it would be useful to have access to the actual (incorrect) visual display data which the SUT displayed on its visual display screen.)

The present invention is a system and method which interfaces a system under test (SUT) with a command (host) mechanism for controlling the SUT. The present invention provides a mechanism by which computer hardware and/or software applications can be tested in a virtually non-intrusive manner, and without using fixed-pacing. The SUT itself comprises computer hardware, and at least one software application executing thereupon.

In a preferred embodiment, the present invention receives input data from a host, and directs the input data to software application(s) on the SUT. The input data is emulated such that it seems to the SUT that the input data is being entered into the SUT directly. In other words, it appears to the SUT that the input data is being entered from a directly-attached input device (for example, a keyboard) rather than being directed through the present invention.

The present invention is also receptive to a command from the host, which causes the present invention to capture visual display signals representative of visual display data from a visual display device on the SUT. In a preferred embodiment, once the visual display signals are captured, the present invention then converts them to a compact format which is representative of the captured visual display signals. This compact representation, which is called a signature, utilizes less space than would the actual visual display data, and thus this signature representation is easier to transfer to the host. Thus, in a preferred embodiment, the visual display signals representative of the visual display data is converted into a signature, and this signature is sent to the host.

When the present invention receives the above-noted command and also receives at least one signature from the host, the present invention captures new visual display signals from the visual display device on the SUT, and generates a new signature therefrom. The present invention then compares the new signature with that of the signature(s) received from the host. The results of this comparison, which indicate whether or not the hardware and/or software application(s) function properly, are then sent to the host.

BRIEF DESCRIPTION OF THE DRAWINGS

Various objects, features, and attendant advantages of the present invention can be more fully appreciated as the same become better understood with reference to the following detailed description of the present invention when considered in connection with the accompanying drawings, in which.

DETAILED DESCRIPTION OF THE PREFERRED EMBODIMENT

I. GENERAL OVERVIEW OF THE SYSTEM AND METHOD

Figure 1A:
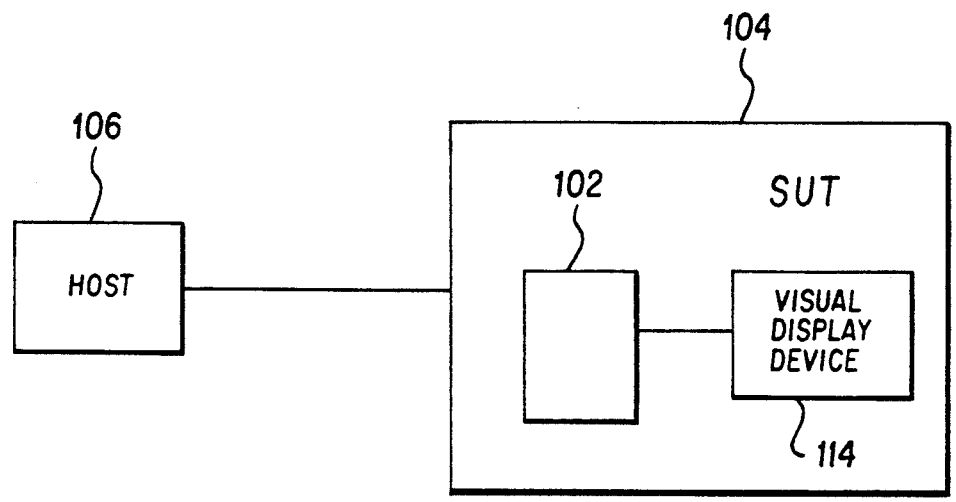
FIG. 1a is a general block diagram of the environment surrounding the present invention.

A. The Role of the Present Invention

The role of the present invention relating generally to the testing of software application(s) running on a computer system is described first.

In general, when a software application is executed on a computer system, a user typically enters a series of input steps, referred to herein as input data, into the computer. This input data may be entered into the computer in a variety of ways depending upon the type of input device used. Typical input devices include a keyboard, a pointing device (such as a mouse or touch screen), a tablet, etc. A result of entering this input data is that it manipulates the software application running on the computer system.

A computer system typically includes a video or some type of visual display screen. An example of such a visual display screen is a CRT (cathode ray tube) monitor. The image displayed by such a visual display screen is based upon signals (hereafter referred to as visual display signals) received by the visual display screen. These signals are in turn controlled by data (hereafter referred to as visual display data) contained in a visual display device. An example of such a visual display device is an EGA graphics adapter card. The manipulation of the software application by the entering of input data typically causes the visual display data to change, which in turn alters the image displayed by the visual display screen. Thus, the visual display data and alteration thereof is dependent upon the specific software application, and the input data entered into it.

In a preferred embodiment, the present invention is a part of a larger automated testing system and method. The larger system and method, entitled "System and Method for Testing Computer Hardware and Software," referenced by U.S. patent application 472,697, integrates the present invention with software modules located on a remote system or device (host) and with computer-related hardware and software system(s) under test (SUT). The application relating to the software modules, entitled "Software Modules for Testing Computer Hardware and Software," referenced by U.S. patent application 472,694, utilizes the capabilities of the present invention so as to perform automated regression testing on software application(s) running on a SUT.

The present invention broadly operates as follows. When the present invention receives input data from a host, it directs the input data to software application(s) on the SUT. The present invention is also receptive to a command from the host, which causes the present invention to capture a representation of visual display data from a visual display device on the SUT. A representation of this visual display data is then sent to the host.

When the present invention receives a command and also receives a representation of visual display data from the host (previously obtained from the SUT), then the present invention captures a new representation of visual display data from the visual display device on the SUT. The present invention then compares the new visual display data representation with that of the visual display data representation received from the host. The results of this comparison are then sent to the host.

A more specific description of a preferred embodiment of the present invention is described with reference to FIG. 1a as follows. When the present invention 102 receives input data from the host 106 as indicated above and directs the input data to the SUT 104, the input data is emulated such that it seems to the SUT 104 that the input data is being entered into the SUT 104 directly. In other words, it appears to the SUT 104 that the input data is being entered from a directly-attached input device (for example, a keyboard) rather than being directed through the present invention 102.

The above-noted command, to which the present invention 102 is receptive, directs the present invention 102 to capture visual display signals, which is representative of the visual display data on a visual display device 114 residing on the SUT 104. Once the visual display signals are captured, the present invention 102 then converts these signals to a compact format which is representative of the captured visual display data. This compact representation, which is called a signature, utilizes less space than would the visual display data, and thus this signature representation easier to transfer and store. Thus, in a preferred embodiment, the visual display signals are converted into a signature, and this signature is sent to the host 106.

In a preferred embodiment, the host 106 can direct the present invention 102 to capture visual display signals from the visual display device 114 several times by sending the present invention 102 multiple commands. In this situation, the present invention 102 then generates the appropriate number of signatures, and sends these signatures to the host 106. This is useful in situations where the visual display signals are constantly in flux, such as when one or more blinking cursors are represented by the visual display data.

When the present invention 102 receives a command and at least one signature from the host 106 as indicated above, it again captures whatever visual display signals are being sent at that time from the visual display device 114 of the SUT 104, and generates a new signature from these newly captured visual display signals. This new signature is then compared to the signature(s) sent from the host 106, and the results of this comparison are sent to the host 106. It should be understood, however, that newly generated signatures can also be sent to the host 106 so that the comparison of signatures can be preformed on the host 106 itself. In a preferred embodiment, the command for capturing the original signatures subsequently transferred through the host is a different command from that for capturing the new signature. However, it should be understood that these commands could also be identical.

While a preferred embodiment of the present invention 102 requires that a visual display device 114 be present, it is not necessary that a visual display screen also be present. In addition, while only the command relating to the capture of visual display data is mentioned above, it should be understood that a preferred embodiment of the present invention 102 is receptive to other commands, which are described below. Also, it should be noted that while the present invention 102 interacts with the host 106 and SUT 104, that the present invention 102 is a separate and distinct entity, and that the host 106 and SUT 104 are not a part of the present invention 102.

A preferred embodiment of the present invention 102 also contemplates other useful features for performing automated regression testing. One such feature allows for the exclusion of certain portions of the visual display signals (which would correspond to portions of a visual display screen image) when capturing these signals from a visual display device 114. This feature prohibits time variant information, such as date stamps or variable paths, from being considered when capturing the visual display signals from the visual display device 114.

Advantageously, since the present invention 102 performs its signature comparison substantially in real-time, performance measurements or response times of the SUT 104 can be made. Performance measurements and response times refer to the actual time it takes the visual display device 114 to generate the appropriate visual display signals after receiving the appropriate input data.

B. Implementation of the Present Invention

Having explained the role of the present invention as it relates to regression testing of software applications, the actual implementation of the system and method of the present invention is generally described next.

1. The Digital Video Processing Unit (DVPU)

Figure 1B:
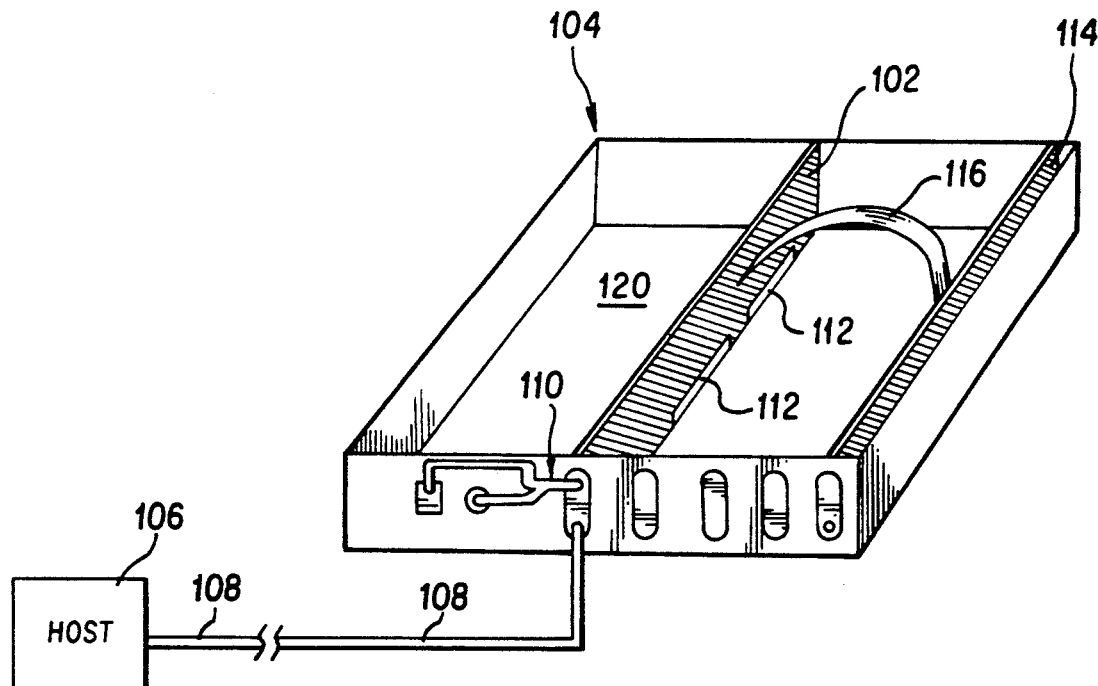
FIG. 1b is a perspective view of a preferred embodiment of the present invention physically located within a system under test and interconnected with a host as it would appear in use.

Referring to FIG. 1b, the present invention, referred to herein as a Digital Video Processing Unit (DVPU) 102, is shown. Also shown is a SUT 104 and a host 106. As stated above, the present invention (that is, the DVPU 102) is responsive to the SUT 104 and host 106, but neither the host 106 nor the SUT 104 are actually a part of the DVPU 102.

FIG. 1b shows a preferred embodiment of the present invention, physically positioned within SUT 104. In this embodiment, DVPU 102 is implemented on a full length IBM Personal Computer accessory printed circuit board to be used within an IBM Personal Computer or compatible system as the SUT 104. Although an IBM Personal Computer System (or compatible) was selected as the SUT 104 to be used with a preferred embodiment of the present invention, it is noted that the present invention encompasses technology which may be utilized with computer systems providing substantially equivalent video display signals. In fact, it is a feature of the present invention, unlike prior related technology, that because of its non-intrusive architecture with respect to SUT 104, DVPU 102 is adaptable for implementation on other computer systems.

FIG. 1b is primarily for illustrative purposes, and should be referred to throughout this general discussion to show the physical implementation of a preferred embodiment of the present invention with respect to host 106 and SUT 104. For purposes of this general discussion, it is sufficient to understand that a datacomm channel 108 is a means for communication purposes between host 106 and DVPU 102; a user input cable 110 is a means for transmission of emulated user input data (in the form of input signals) from DVPU 102 to SUT 104; an edge connector 112 is a means for interfacing the SUT backplane 120 to DVPU 102; and a ribbon cable 116 is a means for accessing visual display signals from a visual display device 114. In a preferred embodiment, the visual display data from which the visual display signals emanate is in the form of digital video data. It is noted, however, that other embodiments of the present invention are contemplated using a variety of differing connecting arrangements of systems and signals not shown in this preferred embodiment.

Figure 2:
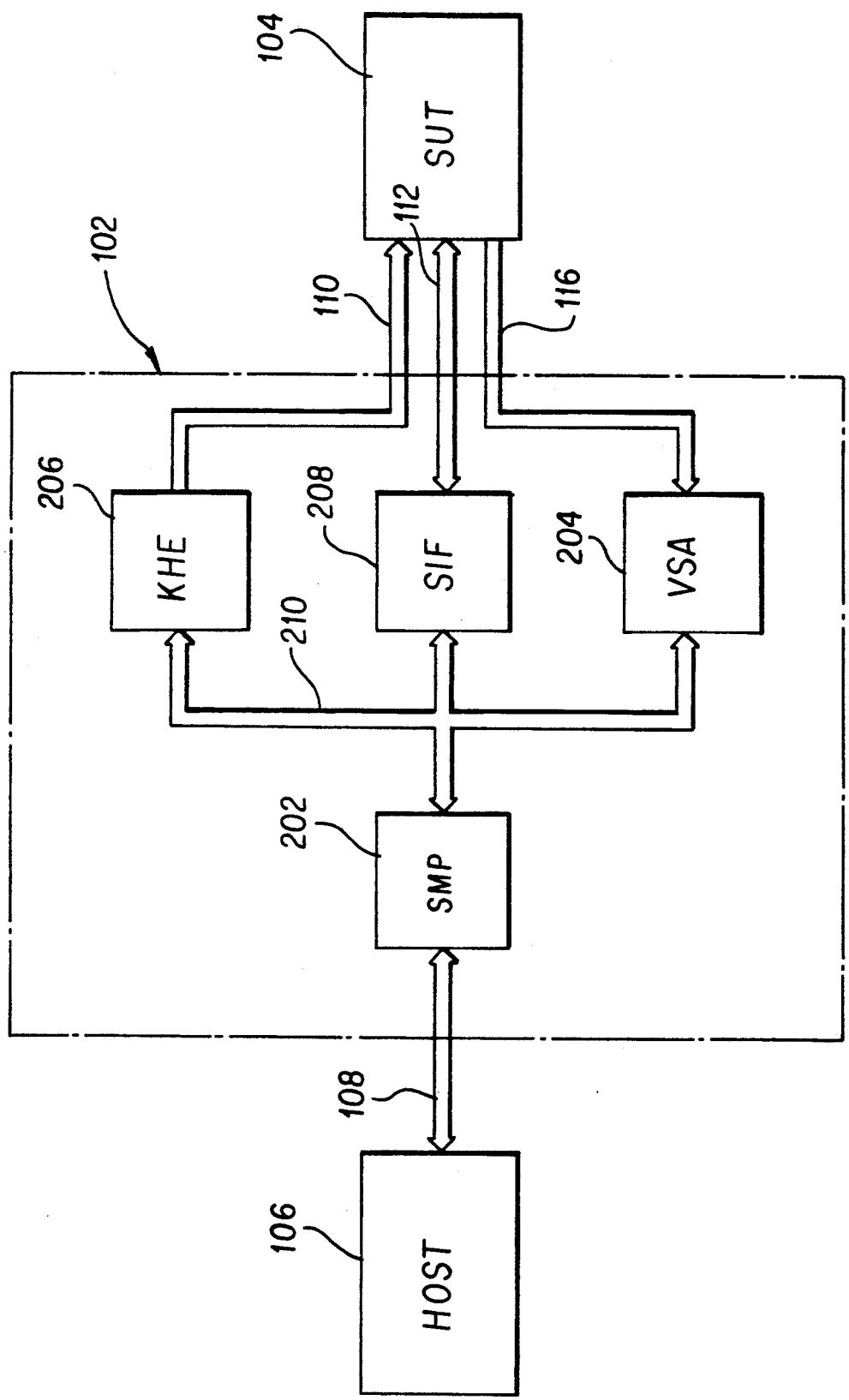
FIG. 2 is a block diagram of the present invention showing its sub-systems and interface with host and SUT systems.

Referring to FIG. 2, a representative block diagram of DVPU 102, according to a preferred embodiment of the present invention, is shown. Also shown are host 106, SUT 104, and associated bus-networking architecture between devices. FIGS. 1 and 2, viewed together, provide both the physical and architectural layout of a preferred embodiment of the present invention with respect to its sub-systems and peripheral systems.

The DVPU 102 draws its power from the power lines of the SUT backplane 120 and consists of four loosely coupled functional sub-systems. These sub-systems include: a system microcontroller (SMP) 202; a Video Signal Analyzer (VSA) 204; a Keyboard/HP-HIL Interface Emulator (KHE) 206; and a System Under Test Interface Port (SIF) 208.

This overview discussion now examines the general composition of each of the four sub-systems of DVPU 102 separately while indicating correlations between sub-systems.

a. Micro-controller Sub-system (SMP)

Figure 3:
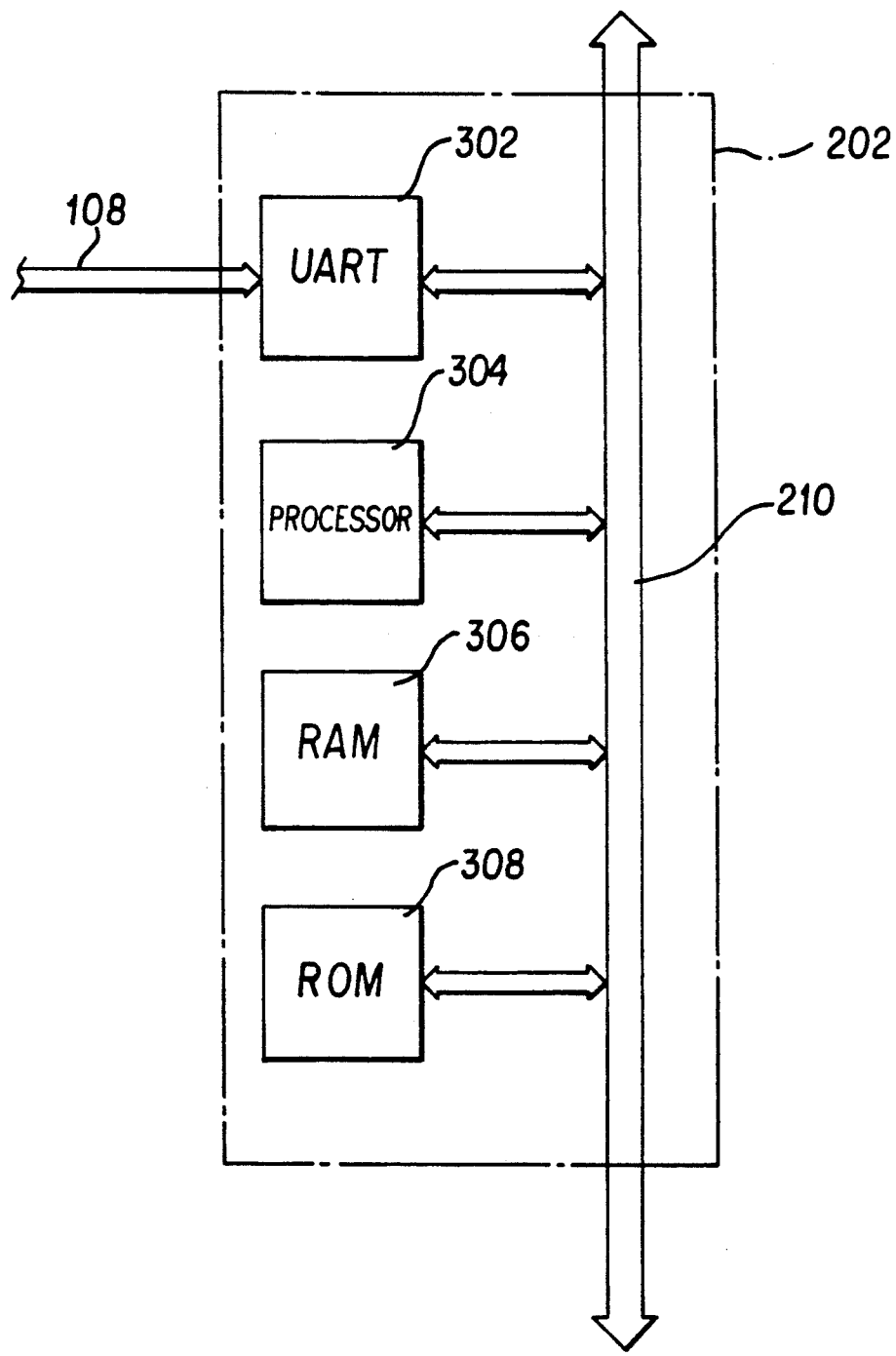
FIG. 3 is a detailed block diagram showing the circuit architecture of the microcontroller (SMP) sub-system 202.

Referring to FIGS. 2 and 3, SMP 202 is based on a simple microprocessor design architecture and essentially controls the visual display signal capture process and all data transfer between sub-systems within the DVPU 102 and between host 106 and SUT 104.

During operation of a preferred embodiment of the present invention, SMP 202 is provided with input data and commands via datacomm 108 from host 106. While the commands are executed by SMP 202, the input data is processed and then delivered to SUT 104 as emulated signals corresponding to signals from an appropriate input device via KHE 206. Commands from host 106 instruct SMP 202 to execute a variety of routines explained more fully below, but mentioned here generally. Routines which SMP 202 executes upon command from host 106 include: a routine which instructs VSA 204 to capture visual display signals from the visual display device 114; a routine which performs a comparison of a representative signature against signatures transferred from host 106; a routine which instructs KHE 206 to emulate an input device and transmit input data received from host 106 to SUT input device ports; a routine which transfers the actual digital video data from visual display device 114 to host 106 via SIF 208 in the event that a comparison between signatures fails.

The above-noted routines are accessed within the SMP code or firmware as a real-time interrupt driven system. That is, SMP 202 normally rests in an idle loop until a command needs to be processed or an interrupt serviced. Interrupts may be sent to SMP 202 by SUT 104 via SIF 208. In addition, some of the abovenoted routines themselves introduce new interrupt service routines during their operation.

Upon completion of command execution, SMP 202 returns to its idle state and awaits the issuance of another command from host 106, an interrupt from SUT 104, or an internal firmware interrupt.

b. Video Signature Analyzer Sub-system (VSA)

Figure 5:
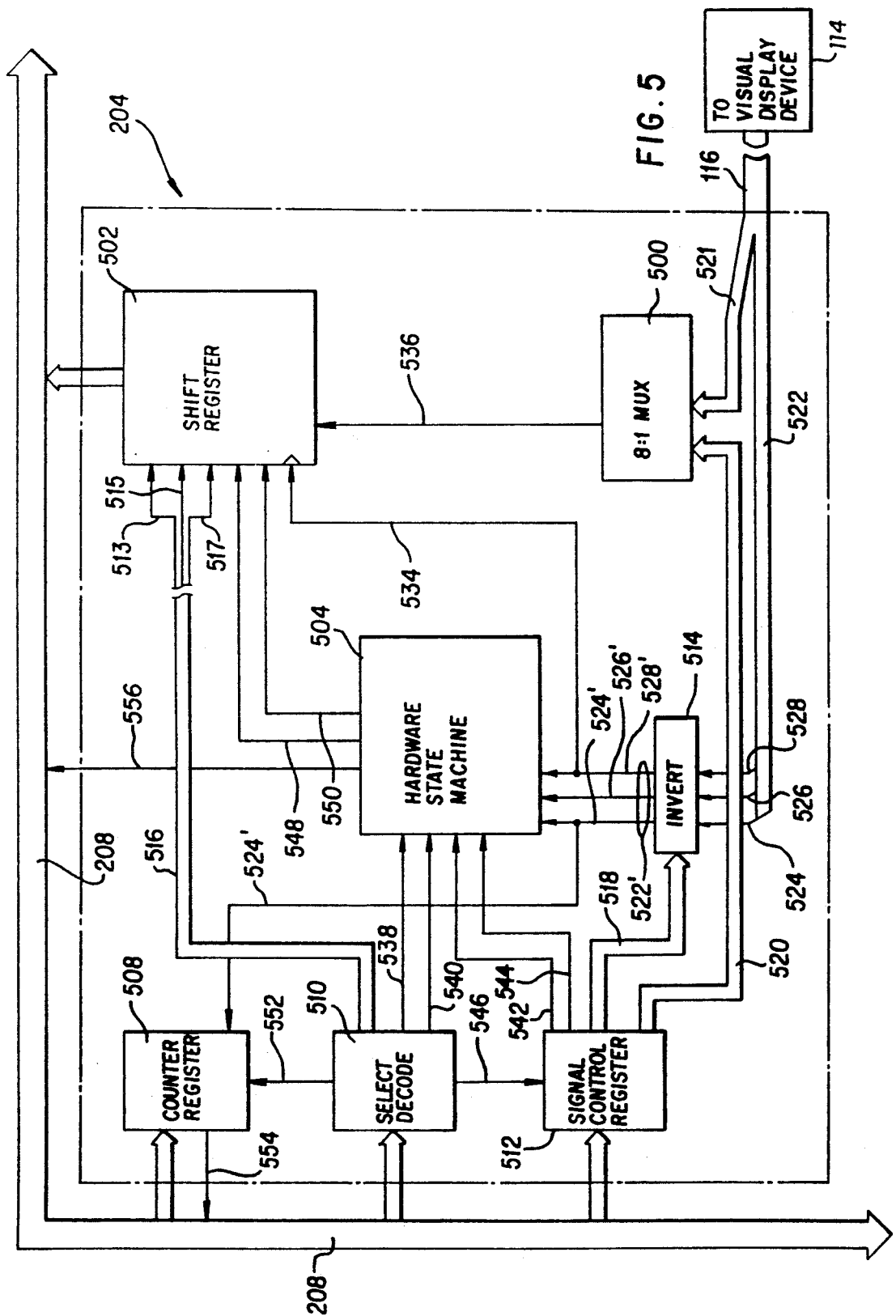
FIG. 5 is a detailed block diagram showing the circuit architecture of the video signal analyzer (VSA) sub-system 204.

Referring to FIGS. 2 and 5, VSA 204 is the central sub-system system of the present invention. Driven by SMP 202, VSA 204 essentially contains all hardware control logic required for capture of visual display signals from visual display device 114. By improving upon the technique pioneered by U.S. Pat. No. 3,976,864 to Gordon et al., which is incorporated by reference herein, VSA 204 is capable of monitoring the digital video signals generated by visual display device 114 in a real-time and non-intrusive manner. VSA 204 is based upon a linear feedback shift register 502 (shown in FIG. 6). Shift register 502 captures the visual display signals received from the visual display device 114 on the SUT 104. The present invention them converts the visual display signals into a signature. A signature is, for example, a six-digit hexadecimal number which is generated from the visual display signals and, uniquely describes the digital video data in a compact form. Thus, such a signature requires less room to store, and less time to transfer.

In a preferred embodiment, shift register 502 is a pseudorandom number generator driven by video control signals 522 from visual display device 114. Video control signals 522 include: a horizontal synchronizing signal 526 referred to as HSYNC 526; a vertical synchronizing signal 524 referred to as VSYNC 524; and a Dot Rate Clock 528 referred to as Clock 528. Advantageously, since these signals are required of all computer systems utilizing digital video data on a visual display device, and since few computer systems lack some sort of visual display device, the present invention is uniquely compatible with most computer systems.

As a further preferred embodiment of the present invention, the polarities of video control signals 522 are selectable. This feature allows DVPU 102 compatibility with SUTs that output various polarities of video control signals by ensuring that the proper edge of each signal is consistent y used within VSA 204. Polarity of video control signals 522 is selectable by means of an inversion control circuitry 514 explained in detail below. It suffices for purposes of this general overview to note that although video control signals VSYNC signal 524, HSYNC signal 526, and Clock signal 528 are selectably polarized by inversion control 514, the signals continue as VSYNC signal 524', HSYNC signal 526', and Clock signal 528' (referred to collectively as video control signals 522') throughout VSA 204.

Shift register 502 is controlled by a hardware state machine 504. Hardware state machine 504 is in turn manipulated by a firmware state machine 1202 (shown in FIG. 12) and video control signals 522'. Advantageously, a simple counter 508 is utilized in the visual display signal capture process so that portions of the visual display signals may be excluded from the resulting signature. This exclusion process is significant since some software application(s) put time variant data on the visual display screen (that is, in the digital video data) such as dates, a clock, or file names, which are not desired to become part of that particular representative signature.

To accommodate the various visual display devices used in a personal computer, VSA 204 has a multiplexer (MUX) 506 (shown in FIG. 5), from which to select separate visual data streams or planes for data input to shift register 502. Advantageously, MUX 506 minimizes testing when different planes contain redundant information, since only one signature of one plane would be necessary to uniquely represent a visual display screen. Moreover, MUX 506 allows for exhaustive testing of all image planes of a multi-plane visual display device, such as an Extended Graphics Adapter (EGA) which requires six planes, or a Video Graphics Array (VGA) which requires eight planes. In a preferred embodiment, MUX 506 is an 8:1 multiplexer which can accommodate up to eight planes of video data such as a VGA monitor requires. SMP 202 keeps track of how many planes are to be signatured and generates a separate signature for each plane. During execution of a multi-plane comparison to valid signature(s), SMP 202 requires that all enabled planes match or a failure is reported.

At the completion of the signaturing process, SMP 202 may be instructed by host 106 either to pass the signature back to host 106 or to execute an on-board comparison against other previously generated (that is, know valid) signatures received from host 106. Passing the signature back to host 106 is generally conducted when host 106 is storing signatures. In a preferred embodiment, the on-board comparison method is preferred since data communication traffic between DVPU 102 and host 106 is kept to a minimum and comparisons can be more closely performed in real-time.

c. Keyboard/HP-HIL Sub-system (KHE)

Referring again to FIG. 2, KHE 206 essentially contains the necessary controlling hardware to emulate input signals from input devices, such as but not limited to a keyboard, pointing device, touch screen or tablet. Generally, operation of KHE 206 involves SMP 202 conveying data to KHE 206 in which KHE 206, emulating a particular input device, transmits input data over a standard input device cable 110 to the appropriate input device port on SUT 104. By way of example and not limitation, in a preferred embodiment of the present invention, Hewlett Packard HP-HIL (Human Interface Link), available from Hewlett Packard Corporation, is utilized to emulated the input devices of KHE 206. In addition to the HP-HIL input device ports, a standard DIN keyboard input device port is also available on KHE 206 of a preferred embodiment.

Thus, in a preferred embodiment of the present invention, KHE 206 is capable of emulating input devices by utilizing the HP-HIL emulation scheme. For example, KHE 206 can be configured to emulate the IBM/AT keyboard input device (a DIN input device) or several HP-HIL devices (that is, devices that utilize the HP-HIL scheme). In the DIN mode, SMP 202 supports IBM-AT protocol for both the IBM mode and the DIN ENVOY made (DIN ENVOY MODE is a Hewlett Packard keyboard layout). The IBM/XT protocol is also supported.

Other embodiments may, in order to emulate other input devices for input to a SUT 104, provide the appropriate control circuitry and protocol necessary for implementation with SMP 202.

d. System under Test Interface Port (SIF)

The DVPU 102 is attached to backplane 120 via the SIF 208 by means of edge connector 112. In a preferred embodiment of the present invention, SIF 208 is used primarily as an I/O port for reading switch settings configuring DVPU 102, and as a communications port for transferring digital video data from the visual display device 114 to host 106 via datacomm 108. Although this transfer of information is intrusive to SUT 104, it is performed only after a SUT 104 fails regression testing. During normal operation, information is transferred via the other sub-systems noted above. Thus, host 106 has direct access to the digital video data corresponding to the actual "failed" display screen of SUT 104.

Both memory and input/output (I/O) devices are present in SIF 208. Basically, SIF 208 acts as an interface port between SUT 104 and host 106. SIF 208 is an 8-bit bi-directional port with provisions for generating an interrupt when written to. Also included in SIF 208 are 8K bytes of ROM and 8K bytes of RAM. This 16K-byte address space and the I/O ports of SIF 208 can be located at any of several addresses normally reserved for the IBM prototype card. Both the memory and the I/O ports of SIF 208 can be relocated to avoid conflicts with hardware installed on SUT 104.

SIF 208 also provides all the necessary hardware for users of DVPU 102 to create routines for special-purpose testing requirements. For example, a routine may be stored within ROM of SIF 208 which may instruct SUT 104 to carry out certain specialized tasks.

II. DETAILED DESCRIPTION OF THE SYSTEM

As Section I, "General Overview of the System and Method" generally describes, a preferred embodiment of DVPU 102 is comprised of four sub-systems as shown in FIG. 2. It should be understood that the present invention contemplates that features implemented by these sub-systems could also be implemented by an arrangement of sub-systems different from that prescribed by this preferred embodiment.

The features of this preferred embodiment of DVPU 102 are implemented on a full-length IBM/AT Personal Computer style accessory board which can also be used within an IBM/XT Personal Computer with its top cover removed. During normal operation, DVPU 102 derives power off the +5Vdc, −12Vdc, and +12Vdc lines of SUT backplane 120 via edge connector 112. Aside from drawing its power from SUT 104, DVPU 102 executes its primary role of capturing visual display signals, generating a representative signature therefrom, and emulating input devices of SUT 104 in a non-intrusive manner.

Although SIF 208 interfaces SUT 104 through backplane edge connector 112 and thereby may intrude SUT 104, such intrusion is seen as a feature of the present invention and selectively occurs if SUT 104 has failed regression testing. For example, intrusion to the digital video data on the visual display device 114 via SIF 208 advantageously allows host 106 to retrieve this digital video data. Thus, although SIF 208 does not play a role in the pass/fail regression testing of the software application(s) on the SUT 104, it does offer significant advantages. If unwanted, the SIF 208 can be disabled.

The following discussion is a detailed description of each individual sub-system and its associated firmware.

Figure 4:
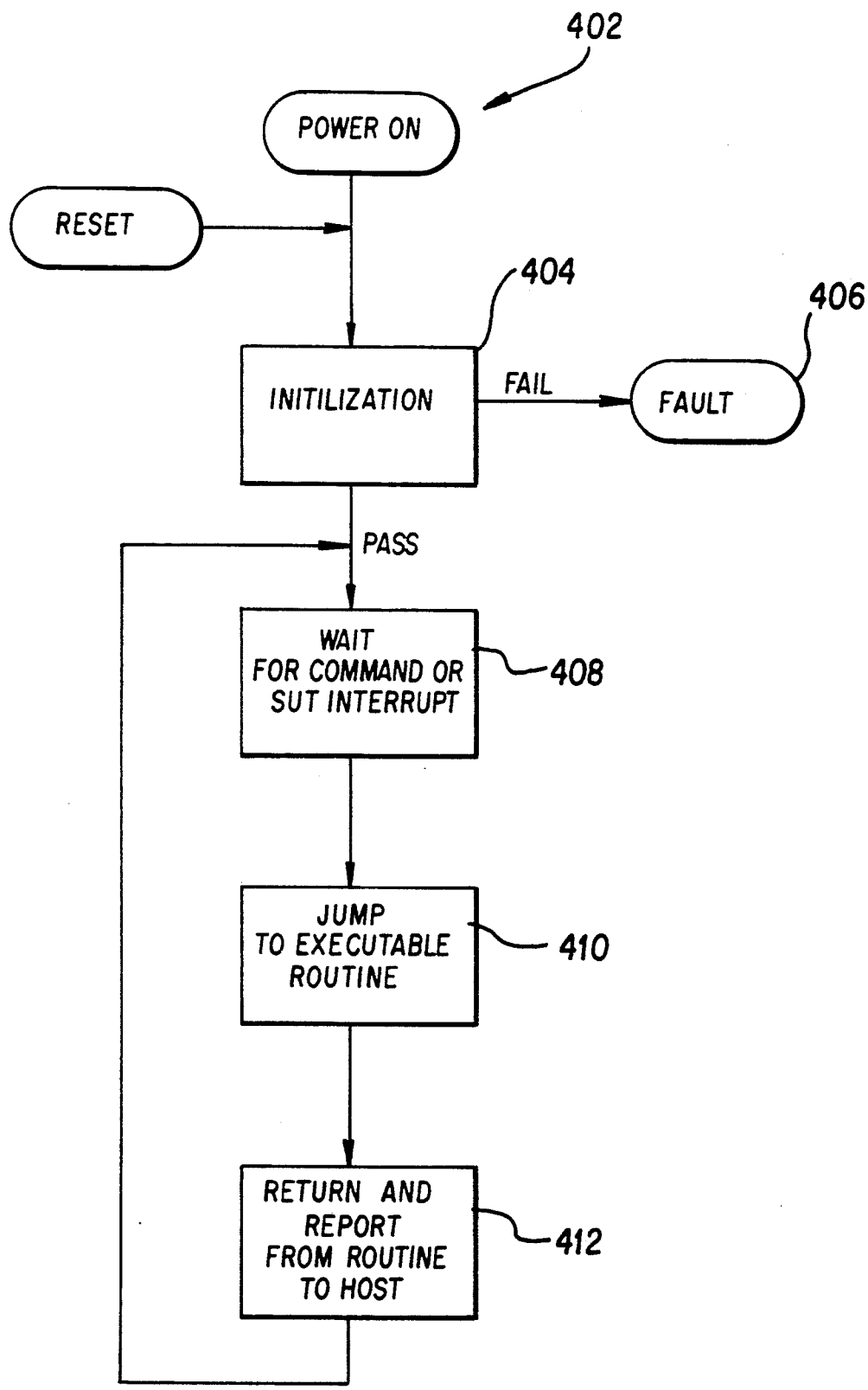
FIG. 4 is a high level flow chart of the operation of the main code on-board the system microcontroller (SMP) sub-system 202 of FIG. 3.

A. Microcontroller Sub-system (SMP) (FIGS. 2–4)

1. Hardware

Referring to FIG. 2, SMP 202 is shown as the central processing unit of DVPU 102. As such, SMP 202 is responsible for all data transfers between sub-systems on-board DVPU 102, and between peripheral systems such as host 106 and SUT 104. SMP 202 also functions as a controlling device and is responsible for controlling VSA 204 regarding visual display signal capture and processing.

Referring to FIG. 3, a detailed block diagram of SMP 202 alone is shown. In a preferred embodiment, the processor 304 used by SMP 202 is an Intel 80188 microprocessor. The Intel 80188 microprocessor is preferred over other processors because of its low cost, high level of integration and compatibility with Intel's 80×86 line of microprocessors, the prominent microprocessor family used throughout the personal computer industry. It is noted, however, that while the Intel 80188 is a preferred controller device, other hardware controlling devices could be utilized in its place.

Processor 304 accesses its memory and peripheral devices via SMP-bus 210. In a preferred embodiment, it is contemplated that SMP-bus 210 is a typical microprocessor bus for an 8-bit microprocessor and comprises address, control, and data lines. Memory used by processor 304 comprises a 32 kbyte Read Only Memory (ROM) block 308 and an 8 kbyte Random Access Memory (RAM) block 306. Although these memory sizes and arrangements are a feature of a preferred embodiment, various other memory sizes and arrangements could also be used. In a preferred embodiment of the present invention, processor 304, an Intel 80188 microprocessor, has access to this memory.

SMP 202 communicates with host 106 via RS-232 data communications channel 108. Processor 304 interfaces with datacomm 108 through a UART 302. A simple terminal emulator routine is present on-board processor 304 (for example, part of the SMP firmware described below) for communication with RS-232 protocol. UART 302 is configured in the same mode as the IBM-AT 9 pin serial port. All the RS-232 handshake lines (CD, DTR, RTS, CTS) are present. Several jumpers located on DVPU 102 are accessible by the SMP firmware for use in configuration of UART 302.

2. SMP Firmware

Processor 304 of SMP 202 executes code typically referred to as firmware. This code, herein referred to as a main SMP Code 402 (shown in FIG. 4) is located in an Erasable Programmable Read Only Memory (EPROM) chip of ROM 308. In a preferred embodiment of the present invention, main SMP Code 402 is written in Intel 80188 machine assembly language. It is understood that in other embodiments, different languages and storage devices could be used to achieve a substantially equivalent result.

Referring to FIGS. 3 and 4, the modular format of main SMP Code 402 is shown. Main SMP Code 402 is written in modular format with all main routines reached via a jump table located in RAM 306. Such a jump table is built during initialization procedures and contains the address locations through which all routine calls are made. Advantageously this facilitates patching or adding new or extended routines. Main SMP Code 402 begins its execution with initialization routines 404. Initialization routines 404 include: an initialization of processor 304 internal registers; a ROM 308 check sum test; a RAM 306 read/write test; an initialization of system interrupt vectors; initialization of a RAM jump table; initialization of UART 302; and initialization of other interrupt driven routines. Configuration of KHE 206 and SIF 208 is also performed during initialization 404 and is discussed below.

If during initialization 404 a fault 406 does not occur, main SMP Code 402 enters a wait state 408. Main SMP Code 404 remains idle in wait state 408 until a command is received from host 106 or an interrupt is triggered by SUT 104. An interrupt from SUT 104 would indicate that data is to be read at SIF 208 by SMP 202.

Advantageously, in a preferred embodiment, all data transmission between host 106 and SMP 202 are in ASCII hexadecimal character format so as to allow complete independence from host 106 data communications. Such format also allows for test scripts on-board host 106 to be stored in easily readable form, assists porting test scripts among other hosts, and eases editing of scripts since no de-compilation is required.

All communication between host 106 and SMP 202 is executed in fixed record formats. Host 106 issues commands to DVPU 102 which are received by SMP 202. SMP 202 then executes the command by performing various routines such as generating a signature or doing a comparison of a signature against earlier recorded signature(s). In a preferred embodiment, the fixed record format of these commands sent from host 106 to SMP 202 is:

\* <COMMAND><RECORD LENGTH><DATA

SPECIFIC TO COMMAND><CHECKSUM>CR

Where:
 \* Is a start of command mark;
 <COMMAND> is a one letter command code;
 <RECORD LENGTH> is the length in bytes (characters) of the data field;
 <DATA SPECIFIC TO COMMAND> contains data which may be needed for SMP 202 to execute the command such as input data to be sent to SUT 104 via KHE 206;
 <CHECK SUM> is the two's complement of the 8-bit sum of the
 <COMMAND>, <RECORD LENGTH>, and <DATA> fields.

The <RECORD LENGTH> and <CHECK SUM> fields are each two characters wide. The

CR (ASCII ODH) delimits the command and is not counted in its length. The maximum length of any record is 128 characters (thus the maximum width of the data field is 122).

Each record is validated upon receipt by SMP 202 and acknowledgment to host 106 is made if an error occurs. Error messages or error codes can be selected to be sent to host 106 when such an error condition occurs. Host 106 can further request a retransmission of the last record sent if an error is reported. A 128-byte buffer memory is provided on-board SMP 202 for receiving data from host 106. Such a buffer allows for more efficient data transmission between host 106 and SMP 202.

Once SMP 202 receives a command from host 106, it executes that command by jumping to the desired executable routine, designated by 410, via the address jump table in RAM 306. SMP 202 performs the routine and returns from it sending its results to host 106, designated by 412. A partial listing of the preferred routines which are performed by SMP 202 include those routines listed in TABLE 1.0 below.

TABLE 1.0

| | |
|---|---|
| DUMP: | Implements a dump of visual display device 114 digital video data contents by uploading it to host 106. |
| HP_HIL: | Sends an HP-HIL device X, Y, and button data to SUT 104 via KHE 206. |
| INCLUDE: | Sets the start and stop limits of the visual display signals to be excluded from a signature. Used to exclude portions of visual display signals representative of time variant information. |
| LOAD: | Implements downloading of code routines to SMP 202. |
| LOAD_SIGLIST: | Implements downloading of valid signature lists for comparison of generated signatures on-board DVPU 102. |
| RESEND: | Re-sends the last data record to host 106 in case of datacomm error. |
| SET_ATTRIBUTE: | Allows host 106 to change default settings on-board DVPU 102. |
| SIGNATURE: | Generates a signature representative of the digital video data residing on the visual display device 114. |
| TEST_&_REPORT: | Uploads sets of variables from SMP 202 to host 106. |
| WAIT_MATCH: | Compares a generated signature against a downloaded list of signature(s) from host 106 until a match or time-out occurs. |

As designated by 412, SMP 202 responds to host 106 with the results of the executed routine in the preferred fixed record format:

<+/±>OPTIONAL DATA>CR LF

Here + indicates successful completion of the command and − indicates failure. Optional parametric data of the record varies by command. For successful completion of a command, the optional data field may contain actual data in a format similar to command records. In case of failure, an error code followed by an optional verbose error message is reported.

Upon completion of command execution and report, SMP 202 returns to idle state 408 to await the issuance of another command from host 106 or an interrupt from SUT 104.

B. Video Signature Analyzer (VSA)

In a preferred embodiment of the present invention, VSA 204 is a combination of both hardware and firmware. The purpose of VSA 204 is to capture visual display signals representative of digital video data on the visual display device 114 on the SUT 104, and to generate a CRC (Cyclical Redundancy Check) or signature. As described above, a signature is a compact value uniquely representative of digital video data. By manipulating video control signals 522 of SUT 104, a signature is generated from the visual display signals (which result in the image on the visual display screen of SUT 104 if there is one). Once generated by VSA 204, a signature is then retrieved from VSA 204 by SMP 202. SMP 202 may, upon instruction from host 106, transmit the signature to the host 106 or compare it against previously acquired (captured) signature(s) downloaded from host 106.

1. VSA Hardware (FIGS. 5-8)

Referring to FIG. 5, data transfer throughout VSA 204 is shown generally. VSA 204, driven by SMP 202, essentially contains all hardware control logic required for the capture of visual display signals from the visual display device 114 of SUT 104, and generation therefrom of a signature. VSA 204, executes its primary function of generating a CRC or signature by means of a liner feedback shift register 502. Shift register 502 is essentially a pseudo-random number generator which accumulates a 24-bit digital representation of a stream of visual display signals. Implementation of shift register 502 is based on Equation 1 below.

$$x^0 = x^1 \text{ XOR } x^{22} \text{ XOR data} \qquad \text{EQU. 1.}$$

where:

$x^0$ = Input Data to be latched through shift register 502

$x^1$ = Current contents of the lowest bit in shift register 502

$x^{22}$ = Current contents of the twenty-second bit of shift register 502.

Data = Stream of visual display signals of SUT 104.

To get the best resolution with the minimum number of parts, a length of 22 bits was chosen for a preferred embodiment of shift register 502, although it should be understood that other lengths may be used depending on the resolution desired.

Figure 6:
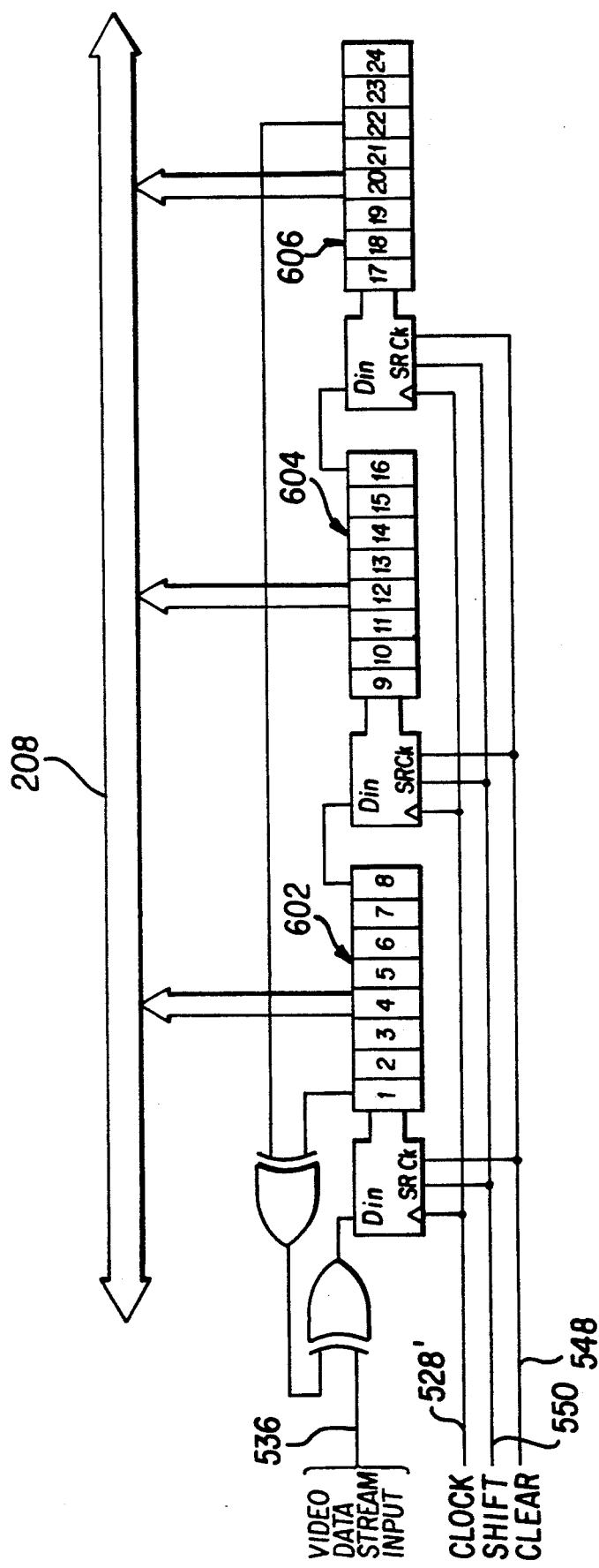
FIG. 6 is a logic diagram of the feedback shift register used to generate signatures from captured streams of visual display signals.

Shift register 502, shown more clearly in FIG. 6, comprises (in a preferred embodiment) three 8-bit shift registers: a Low-Sig register 602, a Mid-Sig register 604, and a Hi-Sig register 606, and is clocked synchronously with Clock signal 528'. Bits 23 and 24 of Hi-Sig register 606 are not placed in the feedback path and cause the total number of states to be multiplied by four. The result of this preferred implementation of shift register 502 is a 100% certainty of detecting any single bit error in data streams up to 8 million bits and a greater than 99.9998% certainty of detecting multiple bit errors.

Referring back to FIG. 5, shift register 502 is controlled by a simple hardware state machine 504 which samples a video data input 536 by Clock signal 528'. Hardware state machine 504 is in turn controlled by a firmware state machine 1202 (shown in FIG. 12) located aboard SMP 202. Firmware state machine 1202 is a set of interrupt service routines (ISRs) and is described in detail in section II(B)(2) (VSA Firmware) below.

To accommodate various visual display devices used in the computer industry, in a preferred embodiment, VSA 204 utilizes an 8:1 multiplexer (MUX) 506. This MUX 506 channels at least one of eight separate visual data streams or plane lines 521 to video data input 536 of shift register 502. Video data plane lines 521 contain TTL level input signals from the visual display device 114 of the SUT 104. Video data plane lines 521 are the equivalent digital signals which can be output from visual display device 114 to a SUT monitor for video display purposes. It is noted that in a preferred embodiment an IBM-PC or compatible system is utilized as the SUT 104 and a visual display device 114 adaptable to that system is required to generate video control and data signals. However, it should be understood that other hardware may be used for the SUT 104 and visual display device 114.

MUX 506 is offered in a preferred embodiment for visual display signals accumulation for visual display devices which utilize a plurality of video data planes. Advantageously, MUX 506 minimizes testing when different planes contain redundant information since a signature of one plane would be equivalent to a signature of the other planes. MUX 506 also allows for exhaustive testing at all image planes of multiplane visual display devices.

MUX 506 is controlled by MUX control lines 520. These control lines 520 are driven by SMP 202, wherein SMP 202 selects the appropriate video data plane for the capture of visual display signals. SMP 202 then writes to a signature control register 512 and latches the address of the desired input channel to MUX 506. Latching the data from SMP-bus 210 is accomplished by an address decoded signal designated as a load signature control register (SCR) 546. Address decoding of SCR 546 is performed with a commercially available programmable array logic (PAL) device referred to as a select decode 510. It should be noted, however, that a variety of methods may be chosen to implement the output control signals of SMP 202. For example, another type of control register could be used.

Address decoding of select decode 510 is also utilized by SMP 202 to activate a counter register 508 by means of a load counter register (CTR) signal 552; to latch the contents of shift register 502 by means of a Rd_Lo signal 513, Rd_Mid signal 515, and Rd_Hi signal 517; check VSA 204 busy status by means of a Rd_Busy signal 538; and to synchronize the visual display signals capture process by means of a pulse Go signal 540.

Select decode 510 generates these control signals upon instruction from SMP firmware during the visual display signals capture process. Rd_Busy signal 538 is a pulse signal which latches a busy signal 556 to SMP-bus 210. SMP 202 can then determine the status of busy signal 556 which reflects the status of VSA 204. GO signal 540 is a pulsed signal which synchronizes the beginning of the visual display signals capture process. Load counter register signal (CTR) 552 is a pulse signal from select decode 510 which latches a numeric value from data bus of SMP-bus 210 into a counter register 508 during the exclusion process. This numeric value pertains to the count of scan lines to be excluded from the signature representative of digital video data. The operation of these signals with respect to the visual display signals capture process is discussed in detail in Section II(B)(3) (VSA Operation) below.

Video control lines 522 from visual display device 114 comprise a vertical synchronizing signal or VSYNC signal 524, a horizontal synchronizing signal or HSYNC signal 526, and a Dot Rate Clock signal 528. VSYNC signal 524 is a pulse signal which indicates to a visual display device the beginning of each screen or vertical trace of a CRT). Similarly, HSYNC signal 526 is a pulse signal which indicates to a visual display device the beginning of each scan line or horizontal trace of a CRT. Dot Rate Clock signal 528 is the synchronizing clock of both VSYNC 524, and HSYNC 526 signals and the visual display signals.

Inversion control 514 allows SMP 202 to selectively control the polarity of video control signals 522. Thus, by selectively inverting video control signals 522 to form inverted video control signals 522', any polarity combination of video control signals inherent in various visual display devices can be accommodated.

Figure 8:
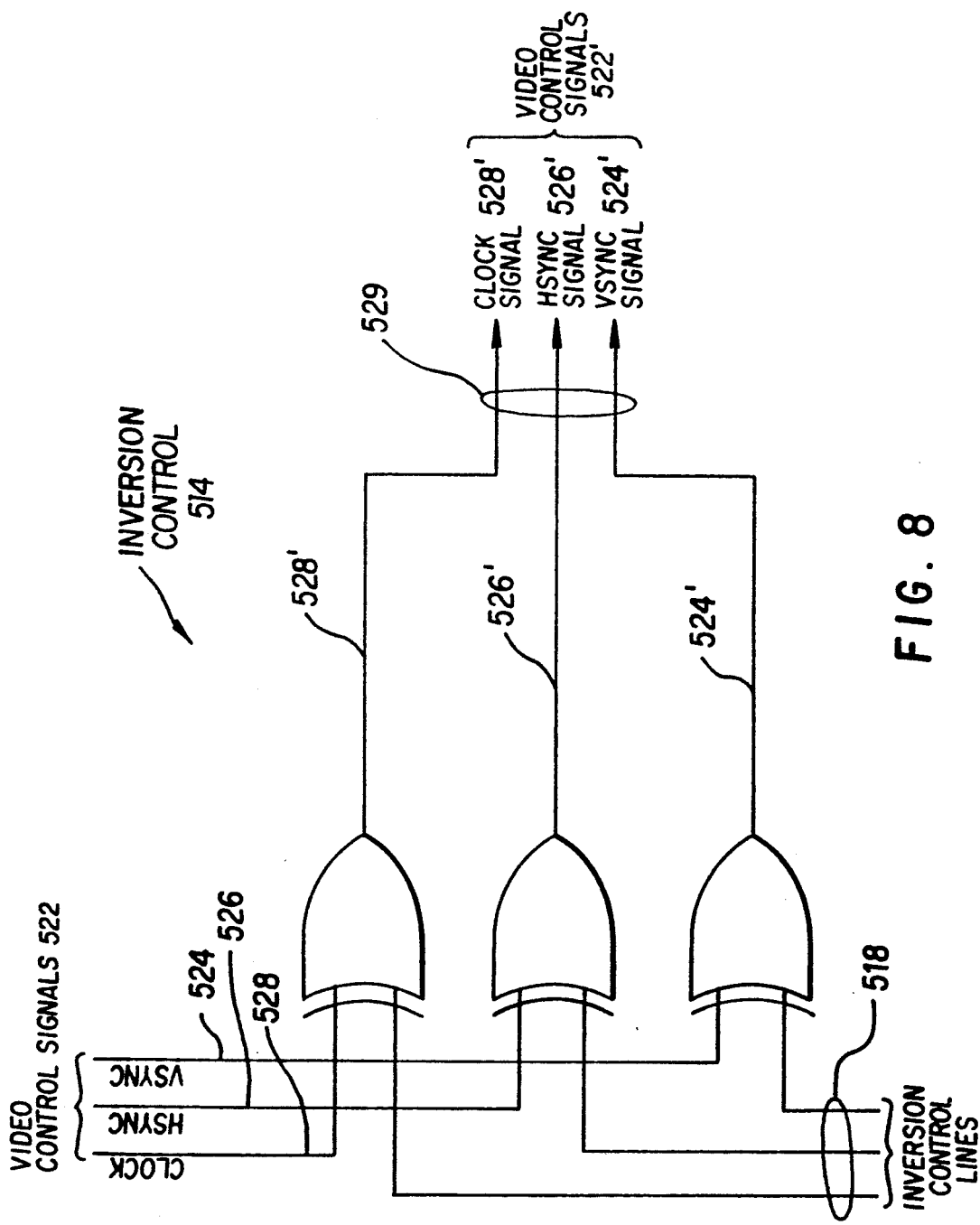
FIG. 8 is a logic diagram of the inversion control circuitry 514 used to select the polarity of the vertical sync, horizontal sync, and dot rate clock signals of the system under test (SUT).

As shown in more detail in FIG. 8, inversion control 514 is implemented in simple XOR logic. Inversion control 514 is driven by SMP 202 in the same manner as MUX 506 is driven by SMP 202. That is, SMP 202 inverts any of video control signals 522 by latching the appropriate value into signature control register 512. A plurality of inversion control lines 518, requiring three latched output bits of select decode 510, provide the polarity signals to inversion control 514. Advantageously, through firmware, SMP 202 can selectively change the polarity of each video control signal 522 as an SUT monitor switches modes during the visual display signals capture process. The resulting signals, VSYNC signal 524', HSYNC signal 523', and Clock signal 528', enter VSA 204 in a known polarized state, namely, rising edge active. Advantageously, this feature of a preferred embodiment, allows for compatibility with various visual display devices by bringing all video data control signals to a known polarity.

As discussed above in the General Overview section, VSA 204 is capable of excluding portions of the visual display signals representative of portions of the digital video data residing on a visual display device. Such visual display signals can start on any scan line (as would be displayed by an attached visual display screen) and end on any other scan line. Counter register 508 is utilized for this exclusionary purpose. Although in a preferred embodiment, counter register 508 is physically located on-board processor 304, it should be understood that counter register 508 can also be implemented using most commercially available data counters.

If portions of the visual display signals are to be excluded, SMP 202 sets counter 508 to a value equal to the number of scan lines of the visual display screen (as represented by the digital video data) that are desired to be excluded. Counter register 508 is then started by SMP 202 when it reaches the first scan line of the excluded portion of the visual display screen image. While counter 508 counts down, shift register 502 is held idle, thereby pausing the visual display signals capture process.

Counter 508 generates an interrupt, referred to as a terminal count signal 554, to SMP 202 when it has counted down from its instructed value and shift register 502 resumes shifting. In this way, SMP 202 can start and stop the signature process according to the portions of the digital video data desired to be excluded.

If no portions of the digital video data are to be excluded, counter 508 is set to an appropriately large value preventing it from generating an interrupt until capture of the visual display signals, representative of that image on the entire visual display screen is completed.

Reset signal 542, active signal 544, inversion control lines 518 and MUX control lines 520 are all signals which leave signature control register 512 and are considered stable at all times. Reset signal 542 resets hardware state machine 504 by resetting a "Run" flip-flop 702, a "Busy" flip-flop 704, and a "Shift" flip-flop 706. (Shown in FIG. 7). Active signal 544 is asserted by SMP 202 to arm or set "J" of "J-K" or "Shift" flip-flop 706. Again, the operation of both these signals with respect to the visual display signal capture process is described in section II(B)(3) (VSA Operation) below.

Both signals, VSYNC signal 524' and terminal count signal 554 of VSA 106, are capable of generating an interrupt to SMP 202. As disclosed in section II(B)(3) (VSA Operation) below, VSYNC signal 524' interrupts SMP 202 when it pulses. Each pulse represents the beginning of each new image on the visual display screen. Terminal count signal 551 interrupts SMP 202 when counter register 508 has reached zero (for example, at the end the desired number of skipped scan lines during the exclusion of portions of visual display signals).

Signals leaving hardware state machine 504 to shift register 502 include: a clear signal 548 and a shift signal 550. Clear signal 548 is asserted by hardware state machine 504 shortly before visual display signal capture occurs and is a pulse signal occurring while Run 708 is set and Busy 556 is not set and clears shift register 502 to a known state of zeros. Shift signal 550 is asserted by "Shift" flip-flop 706. While asserted, shift signal 550 activates shift register 502 resulting in the shifting of the visual display signals at shift register input 536 through shift register 502. Operation of these signals during the visual display signal capture process is discussed further in section II(B)(3) (VSA Operation) below.

2. VSA Firmware

Figure 10:
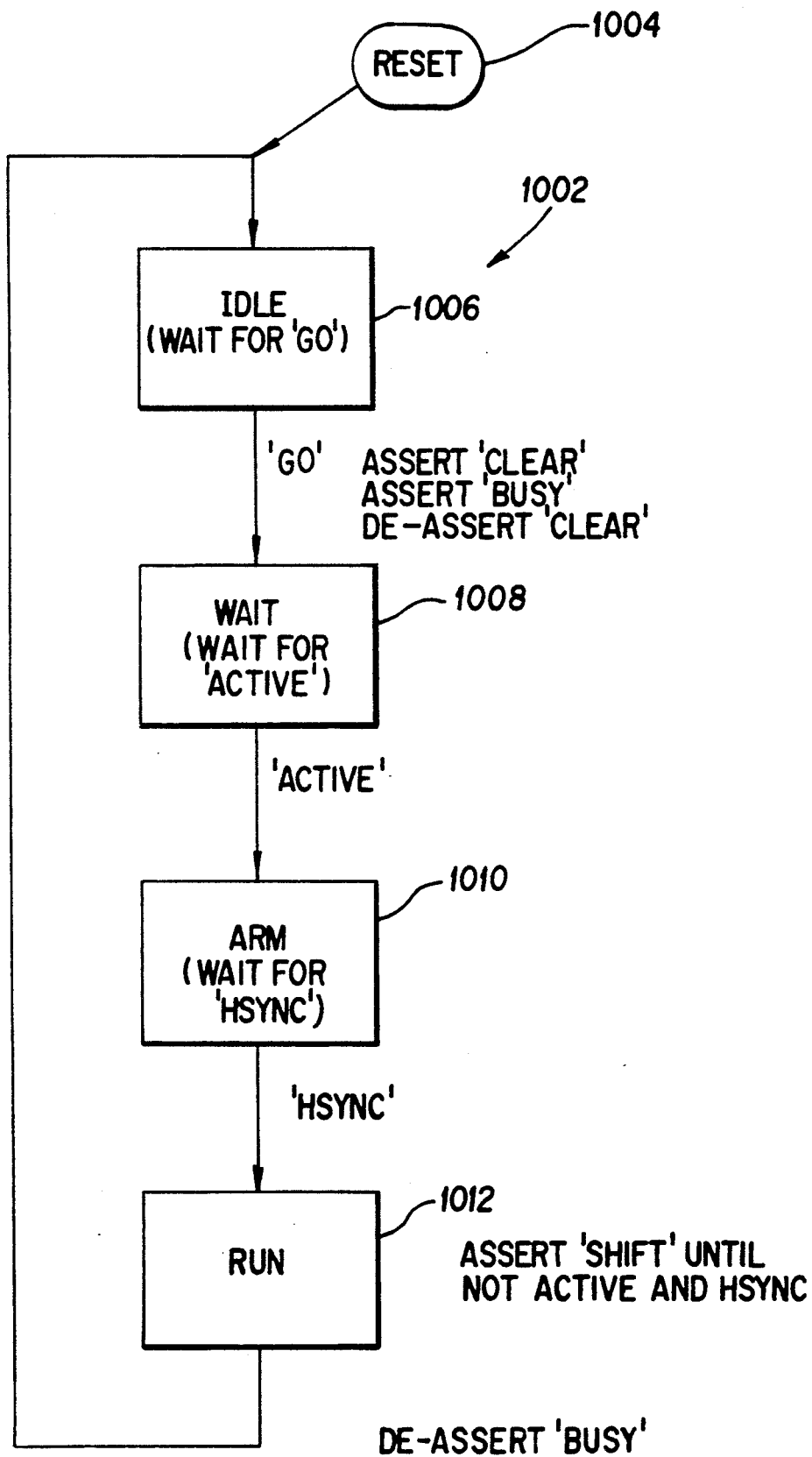
FIG. 10 is a flow chart of the states which the hardware state machine 504 executes during visual display signal capture.
Figure 11:
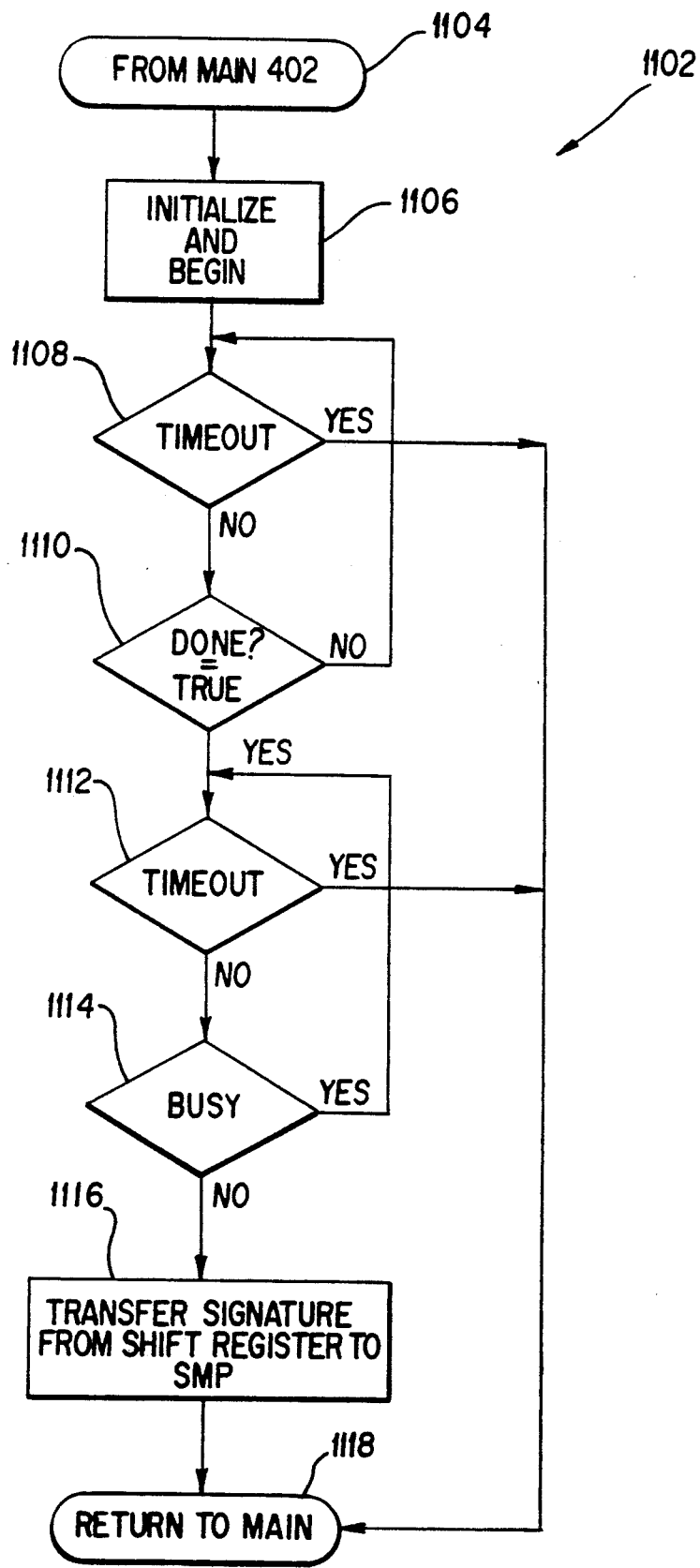
FIG. 11 is a flow chart of the visual display signal capture routine on-board the system microcontroller (SMP).
Figure 12:
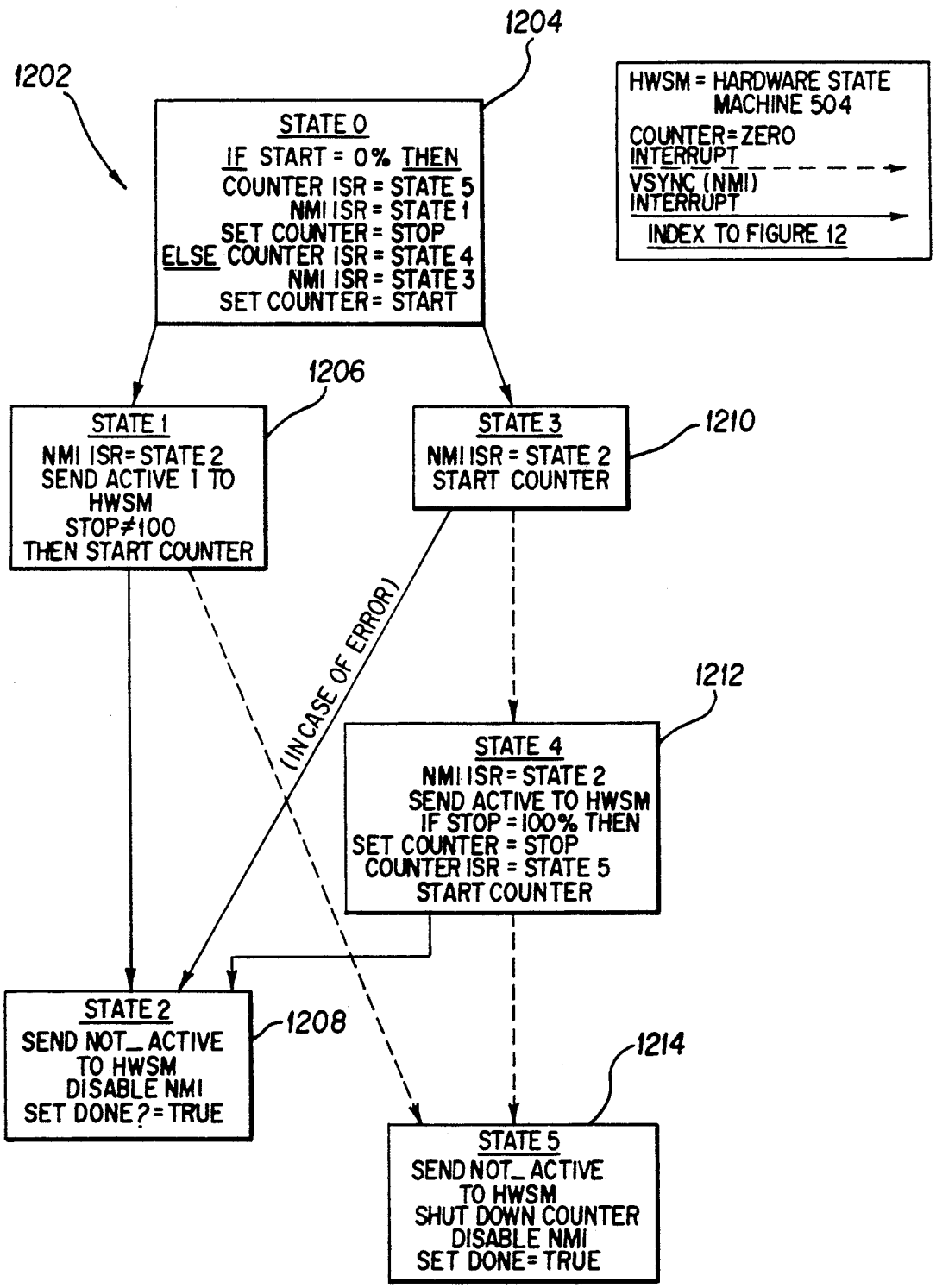
FIG. 12 is a flow chart of the states which the firmware state machine sub-routine executes during visual display signal capture.

The VSA firmware is comprised of routines called by main SMP code 402. As stated above in section II(A)(2) (SMP Firmware) a main visual display signal capture routine 1102 (as shown in FIG. 11) is called by main SMP code 402 for the purpose of having VSA 204 capture visual display signals representative of the visual display screen on the SUT 104. Main visual display signal capture routine 1102 is basically a series of continuous loops which are entered and departed depending on the outcome of various interrupt service routines (ISRs). Such an arrangement of loops and ISRs is considered a firmware state machine 1202, as shown by FIG. 12. Firmware state machine 1202 in turn is responsible for controlling hardware state machine 504. The states which hardware state machine 504 move through are shown in the hardware state machine flow chart of FIG. 10, whereas the states of firmware state machine 1202 is shown in FIG. 12. Hardware state machine 504 has a resolution of one dot rate clock period, while firmware state machine 1202 has a resolution of one scan line.

3. VSA Operation

The visual display signal capture process begins with the execution of main visual display signal capture routine 1102 on-board SMP 202. The structure of main visual display signal capture routine 1102 is generally shown in FIG. 11. FIG. 12 shows a more detailed block diagram of firmware state machine 1202 which main visual display signal capture routine 1102 implements during the visual display signal capture process.

Figure 9:
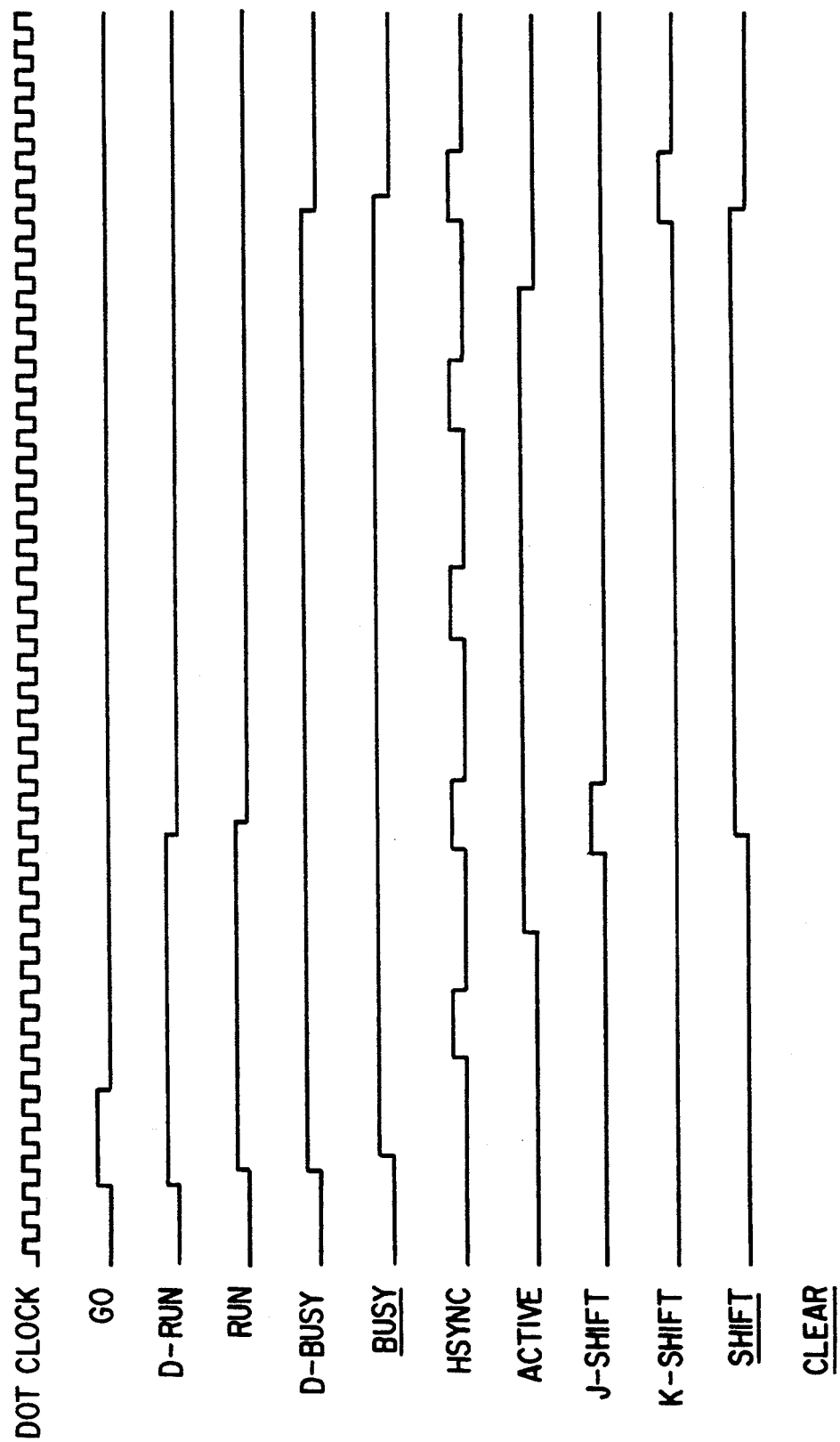
FIG. 9 is a timing diagram showing critical timing moments during visual display signal capture.

Visual display signal accumulation routine 1102 is entered from main SMP code 402, designated as 1104. Visual display signal capture routine 1102 next executes a series of initialization steps and begins visual display signal capture, as designated by 1106. Initialization and begin 1106 can be visualized by referring to FIGS. 5, 7 and 9, and is responsible for: resetting hardware state machine 504, resetting firmware state machine 1202, sending a 'GO' pulse or Go signal 540 to hardware state machine 504, and entering a wait state or timeout loop designated as 1108. FIG. 9 is a timing chart of all signals changing state during visual display signal capture process and should be referred to throughout this discussion of VSA operation.

Figure 7:
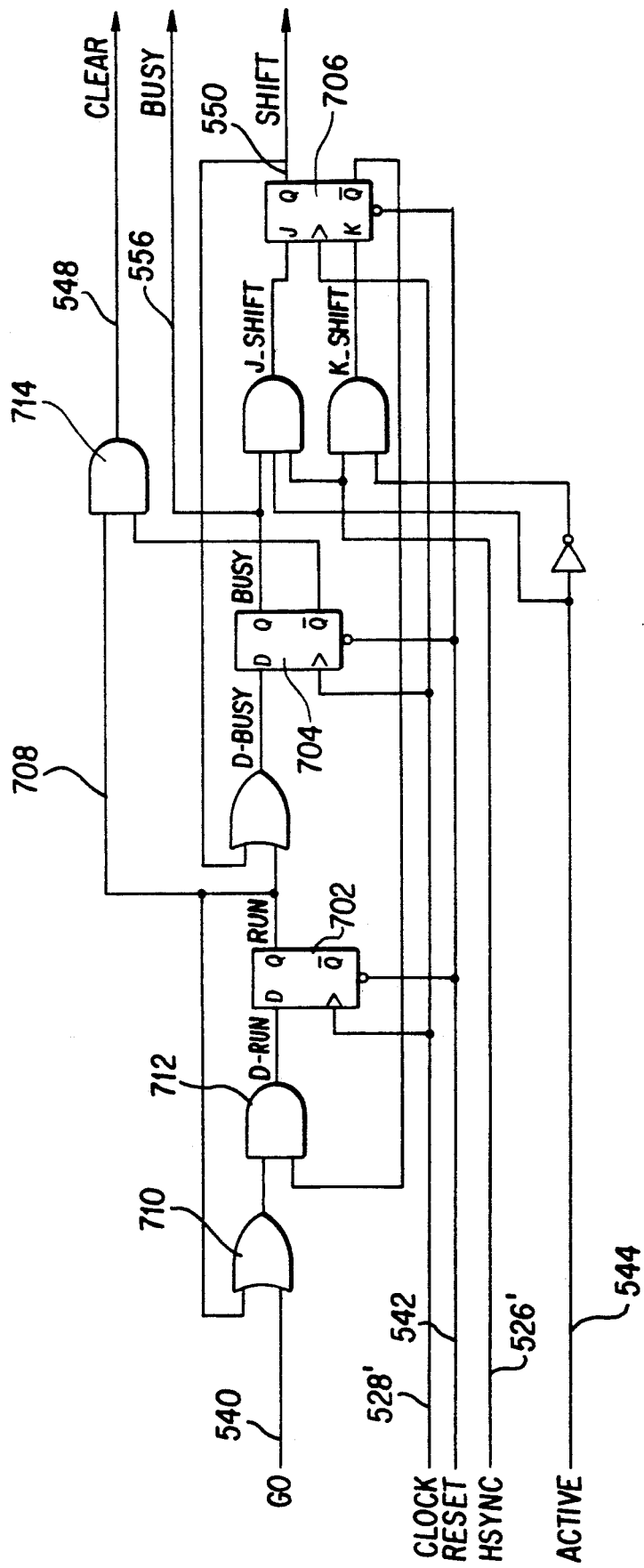
FIG. 7 is a logic diagram of the hardware state machine used to control visual display signal capture regarding the video signature analyzer (VSA) sub-system 204 of FIG. 5.

Reset of hardware state machine 504, designated as a reset state 1004, is accomplished by SMP 202 pulsing reset signal 542. Referring to FIG. 7 and FIG. 9, a pulse of reset signal 542 results in a hardware reset of 'RUN' flip-flop 702, "BUSY" flip-flop 704, and 'SHIFT' flip-flop 706. SMP 202 checks the state of busy signal 556 to ensure it goes false, indicating a successful reset of hardware state machine 504. Busy signal 556 is read by SMP 202 after SMP 202 latches it to SMP-bus 210 by means of Rd_busy signal 538. If busy signal 556 has not gone false within a fixed period of time, an error condition is assumed and the process is terminated with an error indication. Once reset, hardware state machine 504 enters an Idle state 1006, as shown in FIG. 10.

Reset of firmware state machine 1202 is accomplished by SMP 202 initializing its interrupt service routines state to a state '0' designated as 1204.

Having reset both hardware state machine 504 and firmware state machine 1202, the signature process begins on the next active pulse of Go signal 540. The sequence of states which firmware state machine 1202 executes depends on the portions of visual display screen image to be excluded from its representative signature. For example, if the starting line of the visual display screen image is greater than 0% and the stopping line is less than 100%, then a middle portion of the visual display screen image forms the representative signature and firmware state machine 1202 moves through certain appropriate states (shown in FIG. 12). In other words, if the representative signature is to include the entire image displayed on the visual display screen, firmware state machine 1202 is started and stopped by VSYNC Interrupt signal 524' and the state sequence is 0-1-2, shown in FIG. 12. If the start line is not at 0% (for example, a portion of the top of the visual display screen is set to be excluded), then state 3 is entered and counter 508 is loaded with the proper number of scan lines to be skipped. When counter 508 reaches zero, state 4 is entered, shown as 1210, and visual display signal capture is started. If the stop scan line is not 100% (for example, a portion of the bottom of the video display screen is set to be excluded), then either state 1 or state 4 sets up counter 508 to interrupt at the start of the desired portion to be excluded.

Referring to FIGS. 7 and 9, while Go signal 540 is active and 'SHIFT' flip-flop 706 is reset (two signals combined by an AND gate 712, 'RUN' flip-flop 702 is latched, activating a Run signal 708, on the next rising edge of Clock signal 528'. Feedback from Run signal 708 is provided to keep 'RUN' flip-flop 702 from responding to a Go signal 540 pulse while hardware state machine 504 is in any state other than Idle 1006. Go signal 540 must have a duration of at least one dot clock period.

While Run signal 708 is active and before the next rising edge of clock signal 528' or while 'BUSY' flip-flop 704 is reset (two signals combined by an AND gate 714), Clear signal 548 is asserted. While Clear signal 548 is asserted, the contents of shift register 502 are cleared to a known state of zeros. On the next rising edge of Clock signal 528' while Run signal 708 is active, 'BUSY' flip-flop 704 is latched, activating Busy signal 556.

Upon assertion of Busy signal 556, Clear signal 548 is deasserted by 'BUSY' flip-flop 704 and hardware state machine 504 enters a Wait state 1008.

Referring back to FIG. 11, main visual display signal capture routine 1102 enters a Timeout state 1108 where it waits for hardware state machine 504 to respond to Initialize and Begin sequence 1106. Such a response is denoted by assertion of Busy signal 556. If Busy signal 556 is not asserted within a fixed timeout period, designated 1108, main visual display signal capture routine 1102 assumes an error condition and returns to main SMP 202 code, designated 1118.

Upon assertion of Busy signal 556, main visual display signal capture routine 1102 exits its initialization loop, designated by 1106, and begins a visual display signal capture loop shown as 1112 and 1114. At this point, firmware state machine 1202 awaits the beginning of the next visual display screen image indicated by the rising edge of VSYNC signal 524'.

As mentioned above, firmware state machine 1202 asserts Active signal 544 (for example, starts visual display signal capture) depending on the areas of the visual display screen image to be excluded. In any case, assertion of Active signal 544 by SMP 202, while Busy signal 556 is asserted, initially sets the 'J' input of 'SHIFT' flip-flop 706. In this state, hardware state machine 504 is considered to be in an 'ARM' state designated as 1010 in FIG. 10. Shift signal 550 is asserted on the next pulse of HSYNC signal 526' while Busy signal 556 and Active signal 544 are asserted. While Shift signal 550 is asserted, hardware state machine 504 is considered to be in a Run state, designated 1012 in FIG. 10. While in Run state 1012, the visual display signals are shifted through shift register 504.

During visual display signal capture, Shift signal 550 remains asserted until the first rising edge of HSYNC signal 526' after Active signal 544 is deasserted. The resultant signature generated from the visual display signals is the resultant 24-bit digital data within shift register 504 when Shift signal 550 is deasserted.

The final states of firmware state machine 1202, states 2 and 5, designated as 1208 and 1214 respectively, shut down hardware state machine 504, disable any further VSYNC or counter interrupts, and signals main visual display signal capture routine 1102 when Busy signal 556 is deasserted (shown in FIG. 11).

As a fail-safe mechanism, a second timer on-board SMP 202 runs while visual display signals are being captured, and signature generated. If this second timer expires before a signature is reported as done, an error is assumed, the entire process shuts down, and an error message is issued.

One clock period after Shift signal 550 is deasserted, Busy signal 556 is deasserted indicating the visual display signals have been captured. If Busy signal 556 is not deasserted within a fixed period of time after Active signal 548 is deasserted by SMP 202, an error condition is assumed and the process is terminated with an error indication.

Once Busy signal 556 is deasserted, SMP 202 reads the signature from shift register 302 as a 24 bit (6 hex digit) value, designated by 1116 in FIG. 11. A signature is read from shift register 502 in three eight-bit transfers onto SMP-bus 210. Each eight-bit Byte, a Lo-byte, Mid-byte, and Hi-byte is read by SMP 202 off of the data bus of SMP-bus 210. SMP 202 executes this read by asserting Rd_Lo signal 513, Rd_Mid signal 515, and Rd_hi signal 517 control signals respectively.

At the completion of the signaturing process, SMP 202 can either pass the signature back to host 106 or compare it against a list of valid signatures downloaded from the host 106.

C. The Keyboard/HP-HIL Emulator

As discussed above in the General Overview Section, KHE 206 contains the hardware devices and firmware routines necessary to emulate various input device signals. These device signals are then provided to the input device ports of SUT 104 via input cables 110. The structure of KHE 206 sub-system is shown in detail in FIG. 13.

1. Hardware

KHE 206 is essentially comprised of commercially available HP-HIL devices and is directly driven by driver firmware on-board SMP 202. In a preferred embodiment of the present invention, KHE 206 is capable of emulating HP-HIL device signals and the personal computer industry standard DIN interface protocol.

By way of example and not limitation are the HP-HIL and DIN interface protocols implemented in a preferred embodiment of the present invention. It is noted that other embodiments may include the necessary hardware and firmware to accommodate various other input devices.

Figure 13:
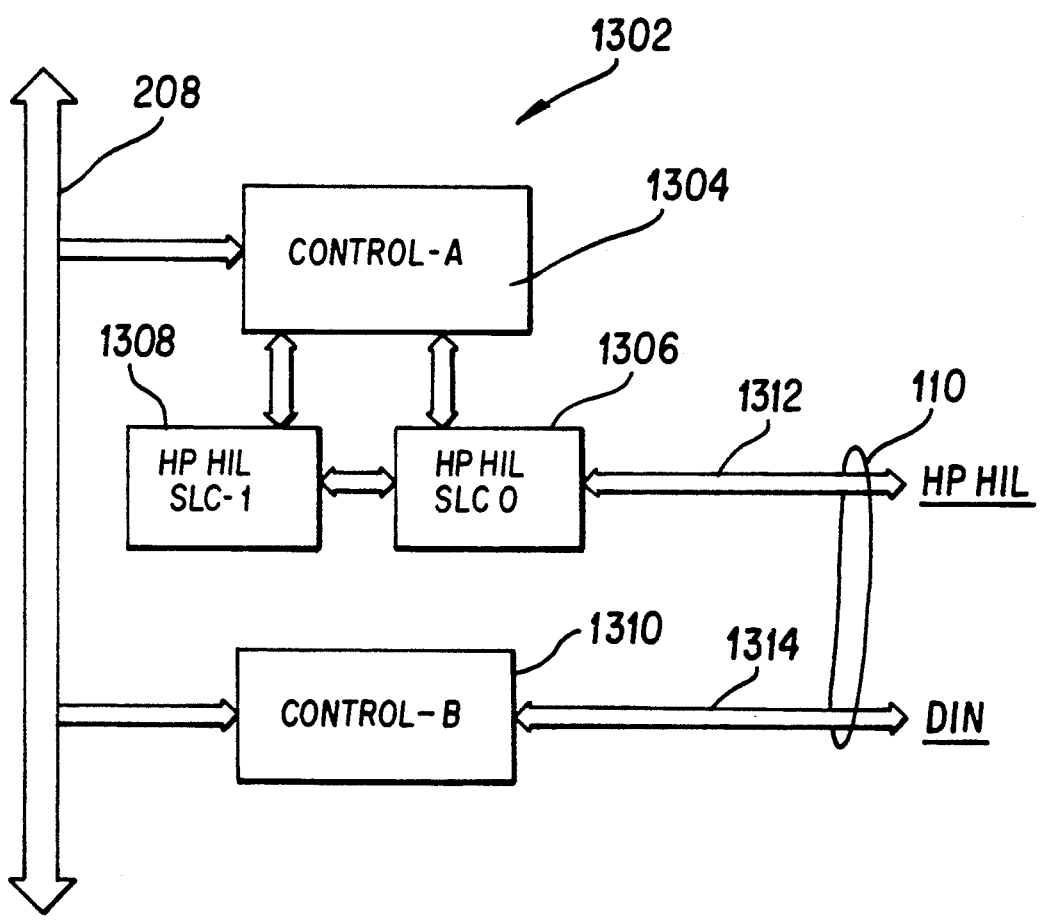
FIG. 13 is a block diagram of the keyboard/HPHIL emulation (KHE) sub-system 206.

Referring now to FIG. 13, in a preferred embodiment, the HP-HIL interface of KHE 206 comprises a control-A 1304, a HP-HIL SLC-1 chip set 1308, a HP-HIL SLC-0 chip set 1306, and an interface cable 1312.

Control-A 1304 contains the commercially available HP-HIL devices which transfer data between SMP 202 via SMP-bus 210 and the HP-HIL individual device driver chip sets referred to herein as HP-HIL SLC-1 1308 and HP-HIL SLC-0 1306. Control-A 1304 interprets the data to be sent to the input device ports of SUT 104 and conveys it to the appropriate HP-HIL device driver to be further processed and conveyed to SUT 104 as recognizable signals from an appropriate input device such as a mouse, touch screen, tablet, etc.

A control-B 1310 likewise contains commercially available hardware which is responsible for interfacing data from SMP 202 via SMP-bus 210 with a DIN interface port of SUT 104. In other embodiments this port may be multiplexed via additional hardware to emulate other DIN devices—such as PS/2 style DIN mouse.

2. Communication

Input data sent from the host 106 to the KHE 206 is a series of keystrokes in either of the following formats:

*J<nn>[<mm><kk>]+<cc>CR

```
*K<nn>[<ww><mm><kk><pp>]-
  +<cc>CR
``` where
* * is the record start mark
* \<nn> is the record length
* \<ww> is the wait time before the key is pressed
* \<mm> is the shift modifier
* \<kk> is the keycode
* \<pp> is the key press time
* \<cc> is the checksum of the record
* + is [. . . ]one or more times.

The time parameters are either explicitly given with the *K command, or are implicit (using the default values) with the *J command.

The keycode is a "generic" code which is translated by KHE 206 into proper code for the keyboard that is being emulated. The time that the key will be pressed or wait is determined by the formula $$time = (t+1) * 32 \text{ ms},$$

where:
t is \<ww> or \<pp>
which offers a range of 32 ms to 8.192 seconds. The shift modifier is a byte with the following bit assignments:

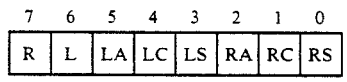

| 7 | 6 | 5 | 4 | 3 | 2 | 1 | 0 |
|---|---|---|---|---|---|---|---|
| R | L | LA | LC | LS | RA | RC | RS | where a 1 in a bit position has the following meaning:
* R—Raw mode. Keycode passed untranslated.
* L—Last key. Keycode ignored. Use to reset shifts.
* LA—left ALT pressed
* LC—left CTRL pressed
* LS—left SHIFT pressed
* RA—right ALT pressed
* RC—right CTRL pressed
* RS—right SHIFT pressed In a preferred embodiment, as each key command is processed the last shift state is compared to the new shift state. Shifts that were "pressed" for the last key and are still pressed for the new key are left "pressed". Shifts that were pressed but are not for the new key are released. Shifts that were not pressed but are for the new key are pressed. These are processed in a left to right manner across the bits of the modifier byte.

The "Last-key" bit causes only shift key codes to be sent.

Figure 14:
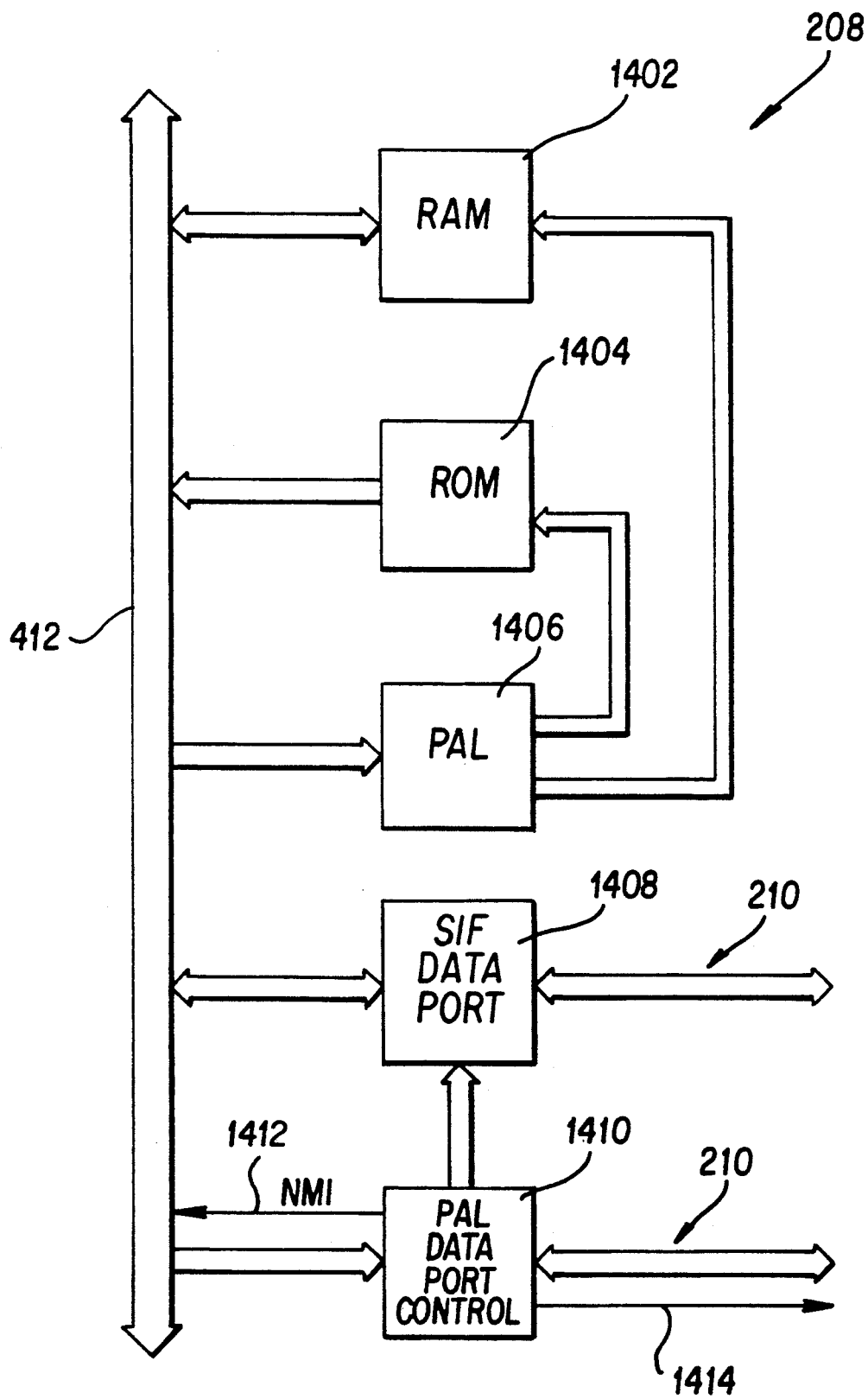
FIG. 14 is a block diagram of the System Under Test Interface (SIF) sub-system showing memory, address decoding and interface ports.

The data sent from host 106 to KHE 206 for HP-HIL or devices other than the keyboard is in the following format:

```
*H<nn><d>[<xxxx><yyyy><bb>]-
  +<cc>CR
``` where
* * is the record start mark
* \<nn> is the record length
* \<d> is the device code
* \<xxxx> is the x value
* \<yyyy> is the y value
* \<bb> is the button value
* \<cc> is the record checksum
* + is [. . . ]one or more times D. The System Under Test Interface SIF 208, shown generally in FIG. 2 and in detail in FIG. 14, is essentially an interface port providing a communication path between DVPU 102 and SUT 104. Advantageously, in a preferred embodiment of the present invention, the backplane of SUT 104 is accessed via edge connector 112 of DVPU 102. This access in the preferred embodiment allows for a parallel communications port between the processors of DVPU 102 and SUT 104. SIF 208 is a peripheral to SUT 104 residing in its backplane in conformance with standard IBM/PC Input/Output (I/O) protocol. Both memory and I/O devices are present in SIF 208.

1. SIF Hardware

In a preferred embodiment, SIF 208 is an 8-bit bi-directional port with provisions for generating an interrupt to either host 106 or SUT 104 when written to by the other. For example, in SUT 104, the interrupt can be either a nonmaskable interrupt (NMI) or any of the interrupt (INTRn) lines of the SUT backplane.

In a preferred embodiment, SIF 208 occupies a 16K byte portion of SUT 104 memory space. Jumpers are provided on DVPU 102 which are read during initialization of SUT 104, and move SIF 208 memory block to any of 8 different locations. Moving SIF 208 memory block to different locations within SUT 104 memory space avoids potential conflict with any other accessory boards which may be within SUT 104. The first 8K bytes of SIF 208 address space is a ROM 1404 and the second 8K bytes is a RAM 1402. In a preferred embodiment, a 27128 EPROM is used as ROM 1404. Although the 27128 is a 16K byte EPROM, a jumper is provided to allow either the first or second half to be active. In this way, two different programs in ROM 1404 may be selected.

Advantageously, since SIF 208 is implemented as an 8-bit port, a fixed minimum number of WAIT states are generated by SUT 104 backplane state machine. This allows 300ns parts to be used on SIF 208 if desired.

In a preferred embodiment, RAM 1402 is implemented with either 2K byte or 8K byte static parts. A jumper is provided on DVPU 102 which is set according to which part is installed.

The starting address of the ROM 1404 and RAM 1402 can be set by jumpers so that it does not conflict with other hardware in the SUT 104. ROM 1404 is at offset 0 in the segment selected by the jumpers. RAM 1402 is at offset 2000H (8K) in that segment. The eight different selectable address space locations include those shown in Table 2.0 below.

TABLE 2.0

| ROM/RAM Address Selection | |
|---|---|
| ROM 1404 address spacr (8K) | RAM 1402 address space (8K) |
| C000:0000 - C000:1FFF C000:3FFF | C000:2000 - |
| C400:0000 - C400:1FFF C400:3FFF | C400:2000 - |
| C800:0000 - C800:1FFF C800:3FFF | C800:2000 - |
| CC00:0000 - CC00:1FFF CC00:3FFF | CC00:2000 - |
| D000:0000 - D000:1FFF D000:3FFF | D000:2000 - |
| D400:0000 - D400:1FFF D400:3FFF | D400:2000 - |
| D800:0000 - D800:1FFF D800:3FFF | D800:2000 - |

TABLE 2.0-continued

| ROM/RAM Address Selection | |
|---|---|
| ROM 1404 address spacr (8K) | RAM 1402 address space (8K) |
| DC00:0000 - DC00:1FFF | DC00:2000 - DC00:3FFF |

Address selection is implemented with a commercially available Programmable Array Logic device (PAL), designated 1406, which executes the address decoding and selects the appropriate address space within ROM 1404 and RAM 1402.

It is noted that SIF 208 memory size and location within SUT 104 memory space is defined with respect to an IBM/PC or compatible as the SUT. Other embodiments may choose any substantially equivalent memory size and address locations to achieve substantially equivalent results.

In a preferred embodiment, ROM 1404 contains SIF code which is installed during the MS-DOS boot sequence of SUT 104. Normal installation of SIF 208 firmware takes over the NMI interrupt vector (0000:0008), shown as a NMI interrupt signal 1412. Any NMI not generated by a write to an SIF data port 1408 is passed along to the normal NMI routine within SUT 104.

RAM 1402 is used as a stack and scratch by SIF 208 firmware. Other than the return address and flags pushed onto SUT 104 system stack when a NMI occurs, SUT 104 system memory is not used by DVPU 102. Thus, DVPU 102 maintains a virtually transparent system to any application running on SUT 104.

SIF 208 operates as a series of I/O ports between DVPU 102 and SUT 104. Within SIF 208 I/O space are six ports. Each port is accessed by address decoding. The address decoding or I/O port access is also implemented with a commercially available Programmable Array Logic (PAL) device located within a PAL Data Port Control 1410. The I/O ports addresses are within the range IBM has reserved for prototyping cards. This range is 300H-31FH. SIF 208 I/O ports can be located in any one of 4 ranges of 8 contiguous addresses: 300H-307H, 308H-30FH, 310H-317H, 318H-31FH. If another address range is desired, the address decode PAL within PAL Data Port Control 1410 can be reprogrammed.

The six input/output data parts of SIF 208 include: a STATUS PORT, a ID PORT, a SCRATCH PORT, a TX DATA PORT, a RX DATA PORT, and a CONFIGURATION JUMPERS PORT. The ports are address decoded by PAL Data Port Control 1410 and are located within the reserved memory address space for prototyping cards on SUT 104.

The STATUS PORT and SCRATCH PORT are located at the same address. The two most significant bits at that address make up the STATUS PORT which pertain to the state of the TX and RX DATA PORTS. The less significant six bits at that address space are utilized as the SCRATCH register.

The ID port is a hardwired data port addressed by SUT 104 which identifies DVPU 102 board. TX and RX DATA PORTS or registers comprise the communication path between SUT 104 and DVPU 102. TX and RX DATA PORT flags are set when the port is written to. The flags are cleared when the port is read and are utilized as the handshake between SIF 208 and DVPU 202. Bit 6 of the SCRATCH register is SUT 104 interrupt enable. Writing a one to this port enables the NMI or IRQ interrupts. Writing a zero to it disables them.

Whenever data is written into the RX DATA register, an interrupt is generated to SUT 104. This is normally NMI interrupt signal 1412. The NMI interrupt can be disabled by a jumper and the IRQ interrupt lines selected. The IRQ line that is used is selected by a set of jumpers.

SIF 208 firmware locates DVPU 102 board by doing writes to the SCRATCH register and reads from the ID register and the STATUS register. The board is found when the DVPU 102 board ID can be read correctly after a write to the SCRATCH register and the SCRATCH register is intact. The choice of these addresses should not have any harmful effects.

The JUMPERS CONFIGURATION PORT contains eight jumpers and is read by SUT 104 during initialization at power-on or boot time. This port can be used for various purposes by the SIF firmware.

Power-up state of the SIF is with the scratch register cleared to zeros (thereby disabling interrupts to SUT 104), the RX Data_Register_Full and the TX_Data_Register_Full flags cleared to zero, and the state of the RX_Data and the TX_Data registers unknown.

2. SIF Firmware

SIF 208 firmware installs itself during the power up or boot sequence and contains routines which perform self tests and determine what type of visual display device is present with SUT 104. The routines for doing screen dumps are contained in this firmware, as is a loader.

All of the major routines in controlling each processor are accessed via a jump table set up in RAM. In this way, any of them can be patched by substitution of new RAM-based code.

It is noted that in other embodiments of the present invention (that is, other than the IBM/PC implementation) implementation at SIF 208 data I/O parts require system specific modifications.

It should be understood that present invention is not limited to its preferred embodiments, and that the examples presented above are merely for the purposes of illustration. The scope of the present invention should therefore be interpreted by the following claims as defined by the forgoing figures and text.

What we claim is:

1. A device for testing hardware and software applications, comprising:
   first means for receiving a command to capture visual display signals representative of an image of a visual display device;
   second means comprising a hardware state machine and a linear feedback shift register controlled by said hardware state machine, for capturing said visual display signals representative of said image on said visual display device;
   third means, responsive to said second means, for making a comparison of said visual display signals with at least one previously captured visual display signal; and
   fourth means, responsive to said third means, for indicating the results of said comparison.

2. A device for testing hardware and software applications, comprising:
   first means for receiving a first command from a remote device in order to capture visual display signals representative of a first image of a visual display device;

second means for selectively capturing portions of said visual display signals;

third means for receiving a second command from said remote device in order to capture new visual display signals representative of a second image of said visual display device;

fourth means for selectively capturing portions of said new visual display signals;

fifth means, responsive to said second and said fourth means, for making a comparison of said visual display signals with said new visual display signals; and sixth means, responsive to said fifth means, for indicating the results of said comparison to said remote device.

3. A device for testing hardware and software application, comprising:

first means for receiving a first command from a remote device in order to capture visual display signals representative of a first image of a visual display device;

second means for selecting a portion of said visual display signals which is representative of at least one plane;

third means for receiving a second command from said remote device in order to capture new visual display signals representative of a second image of said visual display device.

fourth means for selecting a portion of said new visual display signals, which is representative of at least one plane;

fifth means, responsive to said second and said fourth means, for making a comparison of said visual display signals with said new visual display signals; and sixth means, responsive to said fifth means, for indicating the results of said comparison to said remote device.

4. A method for testing software and hardware applications, comprising the steps of:

(1) storing at least one previously generated compact representation of previously captured visual display signals;

(2) capturing a selected portion of visual display signals representative of a portion of an image of a visual display device;

(3) generating a compact representation of said visual display signals;

(4) comparing said compact representation of step (2) with said at least one previously generated compact representation of step (1); and (5) generating a signal indicating identity or nonidentity of said comparison of step (4).

5. A method for testing software and hardware applications, comprising the steps of:

(1) storing at least one previously generated compact representation of previously captured visual display signals;

(2) capturing and non-intrusively selecting a portion of visual display signals representative of at least one plane from a visual display device;

(3) generating a compact representation of said visual display signals;

(4) comparing said compact representation of step (2) with said at least one previously generated compact representation of step (1); and (5) generating a signal indicating identity or nonidentity of said comparison of step (4).

6. A method for testing software and hardware applications, comprising the steps of:

(1) storing at least one previously generated compact representation of previously captured visual display signals;

(2) capturing visual display signals from a visual display device;

(3) generating a compact representation of said visual display signals by shifting said visual display signals through a linear feedback shift register controlled by a hardware state machine using vertical synchronizing and horizontal synchronizing signals to control said hardware state machine;

(4) comparing said compact representation of step (2) with said at least one previously generated compact representation of step (1); and (5) generating a signal indicating identity or nonidentity of said comparison of step (4).

* * * * *